United States Patent
Okamoto

(10) Patent No.: US 8,179,467 B2
(45) Date of Patent: May 15, 2012

(54) ANALOG-SIGNAL PROCESSING CIRCUIT FOR IMPROVING ACCURACY OF ARITHMETIC MEAN OF SIGNALS

(75) Inventor: Ryuta Okamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 445 days.

(21) Appl. No.: 12/555,229

(22) Filed: Sep. 8, 2009

(65) Prior Publication Data
US 2010/0060767 A1 Mar. 11, 2010

(30) Foreign Application Priority Data
Sep. 10, 2008 (JP) ................................. 2008-232388

(51) Int. Cl.
*H04N 3/14* (2006.01)
*H04N 5/335* (2006.01)

(52) U.S. Cl. ...................... 348/308; 348/294

(58) Field of Classification Search .......... 348/300–302, 348/308, 311–312, 294; 250/208.1; 257/290–294
See application file for complete search history.

(56) References Cited

U.S. PATENT DOCUMENTS

| | | | | |
|---|---|---|---|---|
| 5,949,483 | A * | 9/1999 | Fossum et al. | 348/303 |
| 6,794,627 | B2 | 9/2004 | Lyon et al. | |
| 7,548,261 | B2 * | 6/2009 | Yang et al. | 348/241 |
| 8,018,510 | B2 * | 9/2011 | Murata et al. | 348/294 |
| 2005/0052552 | A1 * | 3/2005 | Hashimoto | 348/272 |
| 2005/0270392 | A1 * | 12/2005 | Kikuchi | 348/308 |
| 2005/0270393 | A1 * | 12/2005 | Noda et al. | 348/308 |

FOREIGN PATENT DOCUMENTS

| | | |
|---|---|---|
| JP | 2000-180706 A | 6/2000 |
| JP | 2001-119525 A | 4/2001 |
| JP | 2002-330349 A | 11/2002 |
| JP | 2003-87664 A | 3/2003 |
| JP | 2004-165992 A | 6/2004 |
| JP | 2006-14316 A | 1/2006 |
| JP | 2006-20171 | 1/2006 |
| JP | 2006-310933 A | 11/2006 |
| JP | 2007-174478 A | 7/2007 |

OTHER PUBLICATIONS

Office Action issued Jun. 28, 2011, in Japanese Patent Application No. 2008-232388 (with English-language translation).
Japanese Office Action issued Jan. 4, 2011, in Patent Application No. 2008-232388 with English Translation.

* cited by examiner

*Primary Examiner* — Nhan T Tran
*Assistant Examiner* — Tuan Le
(74) *Attorney, Agent, or Firm* — Oblon, Spivak, McClelland, Maier & Neustadt, L.L.P.

(57) ABSTRACT

In a first signal conversion circuit, a first electrode of a first capacitor is connected to a first signal line, and a second electrode thereof is connected to a first node. In a second capacitor, a third electrode thereof is connected to a second signal line, and a fourth electrode thereof is connected to a second node. In a first inverting amplifier including a first negative feedback switch, a first input electrode is connected to the first node, and a first output electrode is connected to a third node. In a second inverting amplifier including a second negative feedback switch, a second input electrode is connected to the second node. A first averaging switch is connected between a first node and second node. A second averaging switch is connected between third node and fourth node.

20 Claims, 11 Drawing Sheets

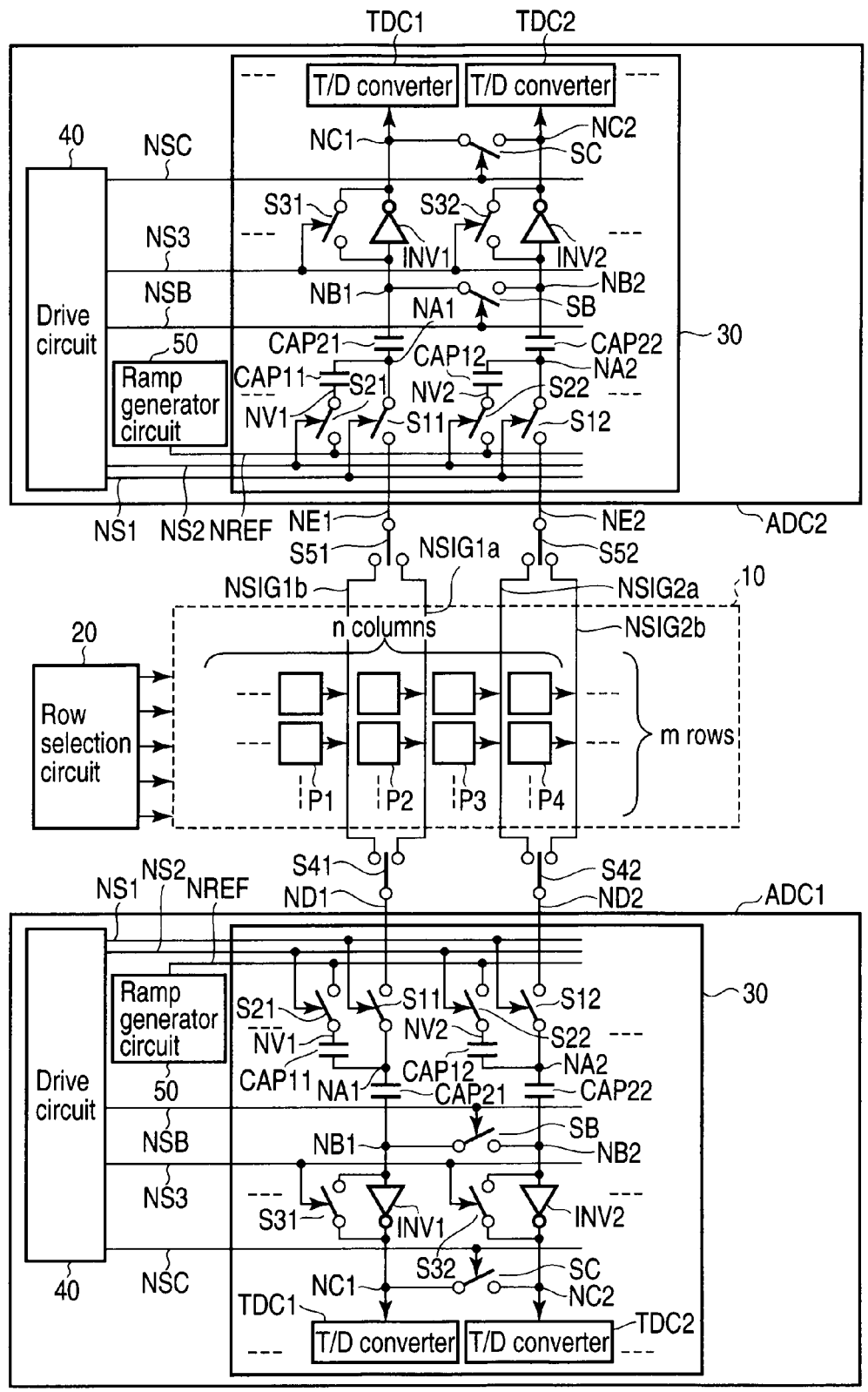
F I G. 4

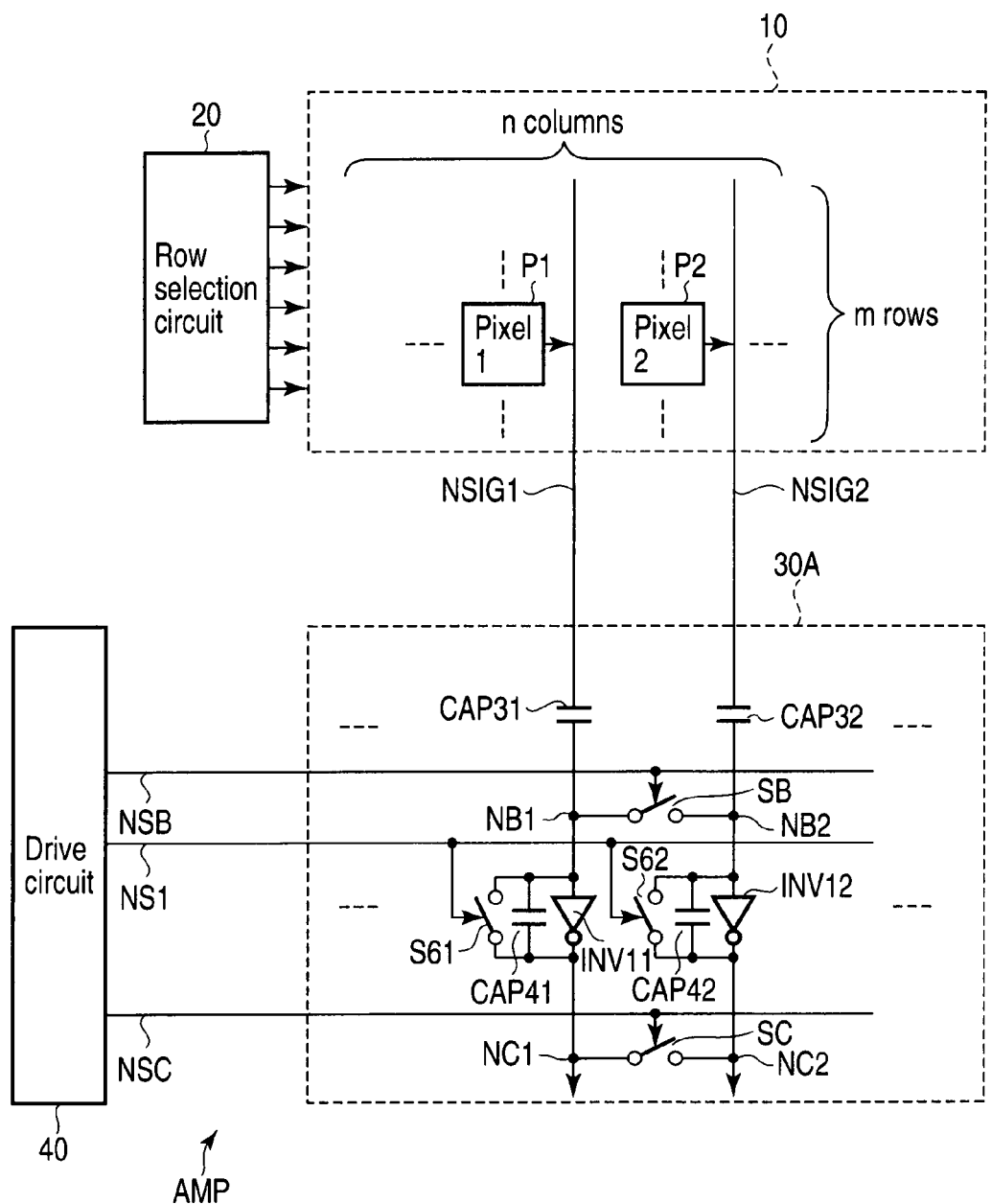
F I G. 5

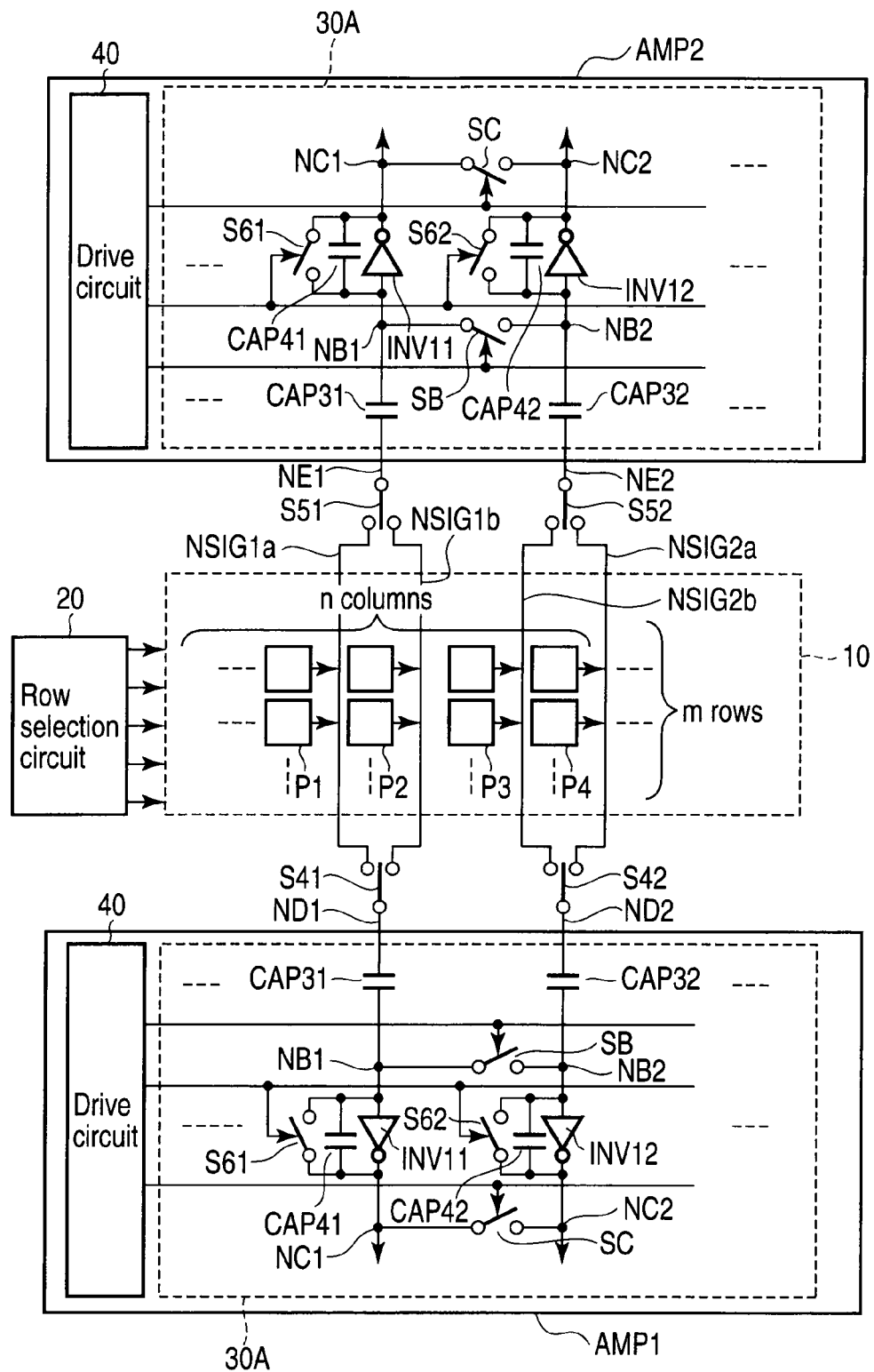
F I G. 8

US 8,179,467 B2

ANALOG-SIGNAL PROCESSING CIRCUIT FOR IMPROVING ACCURACY OF ARITHMETIC MEAN OF SIGNALS

CROSS-REFERENCE TO RELATED APPLICATIONS

This application is based upon and claims the benefit of priority from prior Japanese Patent Application No. 2008-232388, filed Sep. 10, 2008, the entire contents of which are incorporated herein by reference.

BACKGROUND OF THE INVENTION

1. Field of the Invention

The present invention relates to an analog-signal processing circuit provided with switches for carrying out averaging of signals.

2. Description of the Related Art

In a conventional CMOS image sensor, a large number of pixels for outputting voltages corresponding to quantities of light are arranged in order to acquire image information. Outputs from these pixels are converted into a color image by being subjected to A/D conversion and digital signal processing. Here, the higher the number of pixels, the finer the optical information can be acquired, and hence, in recent years, a product in which a large number of pixels are arranged in one chip has become the mainstream.

However, when the number of pixels becomes large, the resolution of the image is increased, whereas there are a drawback that the time necessary for A/D conversion and digital signal processing is increased due to an increase in the data amount, and the time required to take an image is prolonged, and a drawback that the number of images that can be stored in a recording medium the recording capacity of which is limited is reduced. For this reason, a CMOS image sensor of recent years is equipped with a function of making the number of signals to be subjected to A/D conversion less than the actual number of pixels (see, for example, U.S. Pat. No. 6,794,627). However, an arithmetic mean with a high degree of accuracy has not been obtained by the conventional averaging method.

An analog signal processing circuit capable of improving the accuracy of an arithmetic mean of signals is required.

BRIEF SUMMARY OF THE INVENTION

According to a first aspect of the invention, there is provided An analog signal processing circuit comprising: a first signal line; a second signal line; and a first signal conversion circuit connected to the first and second signal lines, wherein the first signal conversion circuit comprises a first capacitor a first electrode of which is connected to the first signal line, and a second electrode of which is connected to a first node; a second capacitor a third electrode of which is connected to the second signal line, and a fourth electrode of which is connected to a second node; a first inverting amplifier a first input electrode of which is connected to the first node, a first output electrode of which is connected to a third node, and which includes a first negative feedback switch; a second inverting amplifier a second input electrode of which is connected to the second node, a second output electrode of which is connected to a fourth node, and which includes a second negative feedback switch; a first averaging switch configured to connect between the first node and second node; and a second averaging switch configured to connect between the third node and fourth node.

According to a second aspect of the invention, there is provided A solid-state image pickup device comprising: first and second photoelectric conversion sections for converting light into an electric signal;
a first signal line configured to receive an electric signal from the first photoelectric conversion section; a second signal line configured to receive an electric signal from the second photoelectric conversion section; and a signal conversion circuit connected to the first and second signal lines, wherein
the signal conversion circuit comprises a first capacitor a first electrode of which is connected to the first signal line, and a second electrode of which is connected to a first node; a second capacitor a third electrode of which is connected to the second signal line, and a fourth electrode of which is connected to a second node; a first inverting amplifier a first input electrode of which is connected to the first node, a first output electrode of which is connected to a third node, and which includes a first negative feedback switch; a second inverting amplifier a second input electrode of which is connected to the second node, a second output electrode of which is connected to a fourth node, and which includes a second negative feedback switch; a first averaging switch configured to connect between the first node and second node; and a second averaging switch configured to connect between the third node and fourth node.

According to a third aspect of the invention, there is provided a solid-state image pickup device comprising: first, second, third, and fourth photoelectric conversion sections for converting light into an electric signal; a first signal line configured to convert an electric signal from the first photoelectric conversion section; a second signal line configured to receive an electric signal from the second photoelectric conversion section; a third signal line configured to receive an electric signal from the third photoelectric conversion section; a fourth signal line for receiving an electric signal from the fourth photoelectric conversion section; a first switch arranged at one ends of the first signal line and second signal line, the first switch connecting one of the first and second signal lines to a fifth signal line; a second switch arranged at one ends of the third signal line and fourth signal line, the second switch connecting one of the third and fourth signal lines to a sixth signal line; a third switch arranged at the other ends of the first signal line and second signal line, the third switch connecting the other one of the first and second signal lines to a seventh signal line; a fourth switch arranged at the other ends of the third signal line and fourth signal line, the fourth switch connecting the other one of the third and fourth signal lines to an eighth signal line; a first signal conversion circuit connected to a first node connected to the fifth signal line, and a second node connected to the sixth signal line; and a second signal conversion circuit connected to a first node connected to the seventh signal line, and a second node connected to the eighth signal line, wherein each of the first and second signal conversion circuits comprises a first capacitor a first electrode of which is connected to the first node, and a second electrode of which is connected to a third node; a second capacitor a third electrode of which is connected to the second node, and a fourth electrode of which is connected to a fourth node; a first inverting amplifier a first input electrode of which is connected to the third node, a first output electrode of which is connected to a fifth node, and which includes a first negative feedback switch; a second inverting amplifier a second input electrode of which is connected to the fourth node, a second output electrode of which is connected to a sixth node, and which includes a second negative feedback switch; a first averaging switch configured to connect between the third node and fourth node; and a second averaging switch configured to connect between the fifth node and sixth node.

BRIEF DESCRIPTION OF THE SEVERAL VIEWS OF THE DRAWING

FIG. 4 is a circuit diagram showing a solid-state image pickup device according to a second embodiment of the present invention.

FIG. 5 is a circuit diagram showing a solid-state image pickup device according to a third embodiment of the present invention.

FIG. 8 is a circuit diagram showing a solid-state image pickup device according to a fourth embodiment of the present invention.

DETAILED DESCRIPTION OF THE INVENTION

Embodiments of the present invention will be described below with reference to the accompanying drawings. It should be noted that the solid-state image pickup device according to each embodiment is used as, for example, a CMOS image sensor.

First Embodiment

A first embodiment is an example in which averaging switches SB and SC for opening or short-circuiting input and output ends of inverters INV1 and INV2 connected to two vertical signal lines are provided. It should be noted that in each of the embodiments, the case where the number of columns to be opened or short-circuited by the averaging switches is two will be described. However, the number of columns is not limited to this, and may be three or more.

[1-1] Configuration

Figure 1:
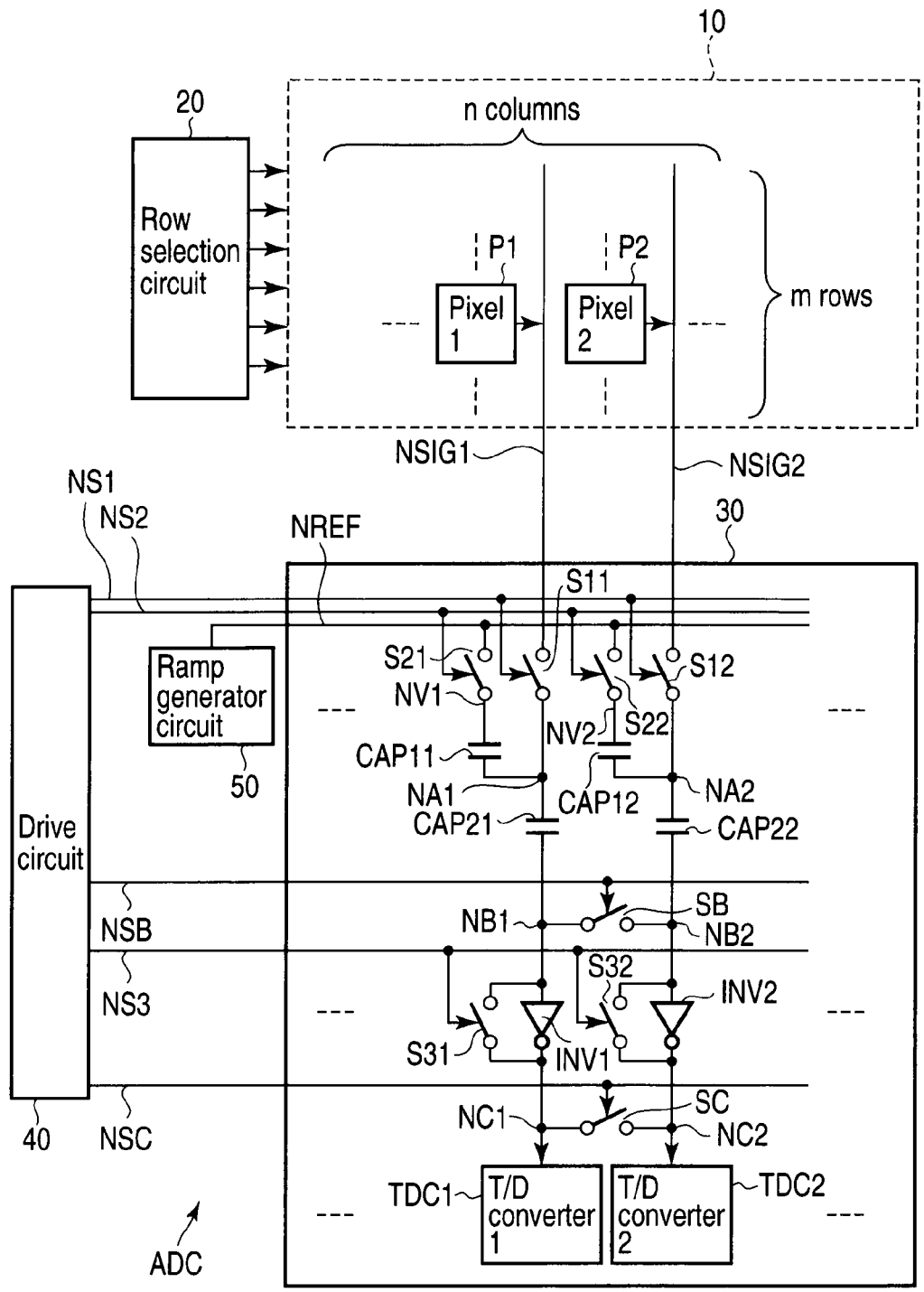
FIG. 1 is a circuit diagram showing a solid-state image pickup device according to a first embodiment of the present invention.

FIG. 1 shows a circuit diagram of a solid-state image pickup device according to the first embodiment of the present invention. The circuit configuration of the solid-state image pickup device according to the first embodiment will be described below.

As shown in FIG. 1, the solid-state image pickup device is provided with a pixel group 10, row selection circuit 20, sample-and-hold signal conversion circuit group 30, drive circuit 40, and ramp generator circuit 50. Here, the sample-and-hold signal conversion circuit group 30, drive circuit 40, and ramp generator circuit 50 constitute an Analog to Digital (AD) converter ADC (analog signal processing circuit).

The pixel group 10 includes a plurality of pixels P (for example, P1 and P2). The plurality of pixels P are arranged two-dimensionally in m rows in the longitudinal direction, and in n columns in the lateral direction. In this case, m and n are natural numbers. Each pixel P outputs a voltage proportional to the intensity of light to a vertical signal line NSIG (for example, NSIG1 or NSIG2). Pixels P arranged in the longitudinal direction share a vertical signal line NSIG with each other, and hence n vertical signal lines NSIG are present. An arbitrary pixel P is selected from m pixels P in the longitudinal direction connected to one vertical signal line NSIG by a row selection circuit 20. An electric signal in the selected pixel P is output to the vertical signal line NSIG, and is further input to each sample-and-hold signal conversion circuit in the sample-and-hold signal conversion circuit group 30.

The sample-and-hold signal conversion circuit group 30 includes, like the vertical signal lines NSIG, n sets of sample-and-hold signal conversion circuits. One sample-and-hold signal conversion circuit set is constituted of switches, capacitors, an inverter, and Time to Digital (T/D) converter. Here, the T/D converter holds and outputs a counter value at and after a certain time. The switch may be of any type, such as an NMOS transistor, PMOS transistor, and the like.

The drive circuit 40 controls voltages of common control lines NS1, NS2, NS3, NSB, and NSC of the individual switches in the sample-and-hold signal conversion circuit group 30. The common control lines NS1, NS2, NS3, NSB, and NSC are common to all the sample-and-hold signal conversion circuits in the sample-and-hold signal conversion circuit group 30. The drive circuit 40 includes a determination circuit for determining which of normal processing and averaging processing is to be carried out.

The ramp generator circuit 50 outputs a reference voltage for A/D conversion through a ramp signal line NREF. The ramp signal line NREF is common to all the sample-and-hold signal conversion circuits in the sample-and-hold signal conversion circuit group 30.

Such a solid-state image pickup device as described above will be described below in detail with attention to the pixels P1 and P2.

The pixels P1 and P2 are connected to the vertical signal lines NSIG1 and NSIG2, respectively. The vertical signal lines NSIG1 and NSIG2 are respectively connected to the sample-and-hold signal conversion circuits in the sample-and-hold signal conversion circuit group 30.

The sample-and-hold signal conversion circuit corresponding to the vertical signal line NSIG1 includes switches S11, S21, and S31, capacitors CAP11 and CAP12, an inverter INV1, and T/D converter TDC1.

The switch S11 is controlled by the common control line NS1, and opens (disconnects) or short-circuits (connects) the vertical signal line NSIG1 and a node NA1. The switch S21 is controlled by the common control line NS2, and opens or short-circuits the ramp signal line NREF and a node NV1. The switch S31 is controlled by the common control line NS3, and opens or short-circuits a node NB1 and node NC1. In the capacitor CAP11, one electrode is connected to the node NA1, and the other electrode is connected to the node NV1. In the capacitor CAP21, one electrode is connected to the node NA1, and the other electrode is connected to the node NB1. In the inverter INV1, an inverting input electrode is connected to the node NB1, and an output electrode is connected to the node NC1. Here, the switch S31 is connected to the input end and output end of the inverter INV1. The inverter INV1 and switch S31 constitute an inverting amplifier including a negative feedback switch. In the T/D converter TDC1, an input terminal is connected to the node NC1, and a counter value at a timing at which a voltage of the node NC1 at or after a predetermined time is switched from a high level to a low level is held and output.

The sample-and-hold signal conversion circuit corresponding to the vertical signal line NSIG2 includes switches S12, S22, and S32, capacitors CAP12 and CAP22, an inverter INV2, and T/D converter TDC2.

The switch S12 is controlled by the common control line NS1, and opens (disconnects) or short-circuits (connects) the vertical signal line NSIG2 and a node NA2. The switch S22 is controlled by the common control line NS2, and opens or short-circuits the ramp signal line NREF and a node NV2. The switch S32 is controlled by the common control line NS3, and opens or short-circuits a node NB2 and node NC2. In the capacitor CAP12, one electrode is connected to the node NA2, and the other electrode is connected to the node NV2. In the capacitor CAP22, one electrode is connected to the node NA2, and the other electrode is connected to the node NB2. In the inverter INV2, an inverting input electrode is connected to the node NB2 and an output electrode is connected to the node NC2. Here, the switch S32 is connected to the input end and output end of the inverter INV2. The inverter INV2 and switch S32 constitute an inverting amplifier including a negative feedback switch. In the T/D converter TDC2, an input terminal is connected to the node NC2, and a counter value at a timing at which a voltage of the node NC2 at or after a predetermined time is switched from a high level to a low level is held and output.

The averaging switches SB and SC is shared the two sets of sample-and-hold signal conversion circuits corresponding to the vertical signal lines NSIG1 and NSIG2. The averaging switch SB is controlled by the common control line NSB, and opens or short-circuits the node NB1 and node NB2. The averaging switch SC is controlled by the common control line NSC, and opens or short-circuits the node NC1 and node NC2. By turning on the averaging switches SB and SC, the vertical signal lines NSIG1 and NSIG2 are averaged. Accordingly, the signal outputs of pixels P1 and P2 are averaged.

[1-2] Normal Operation

Figure 2:
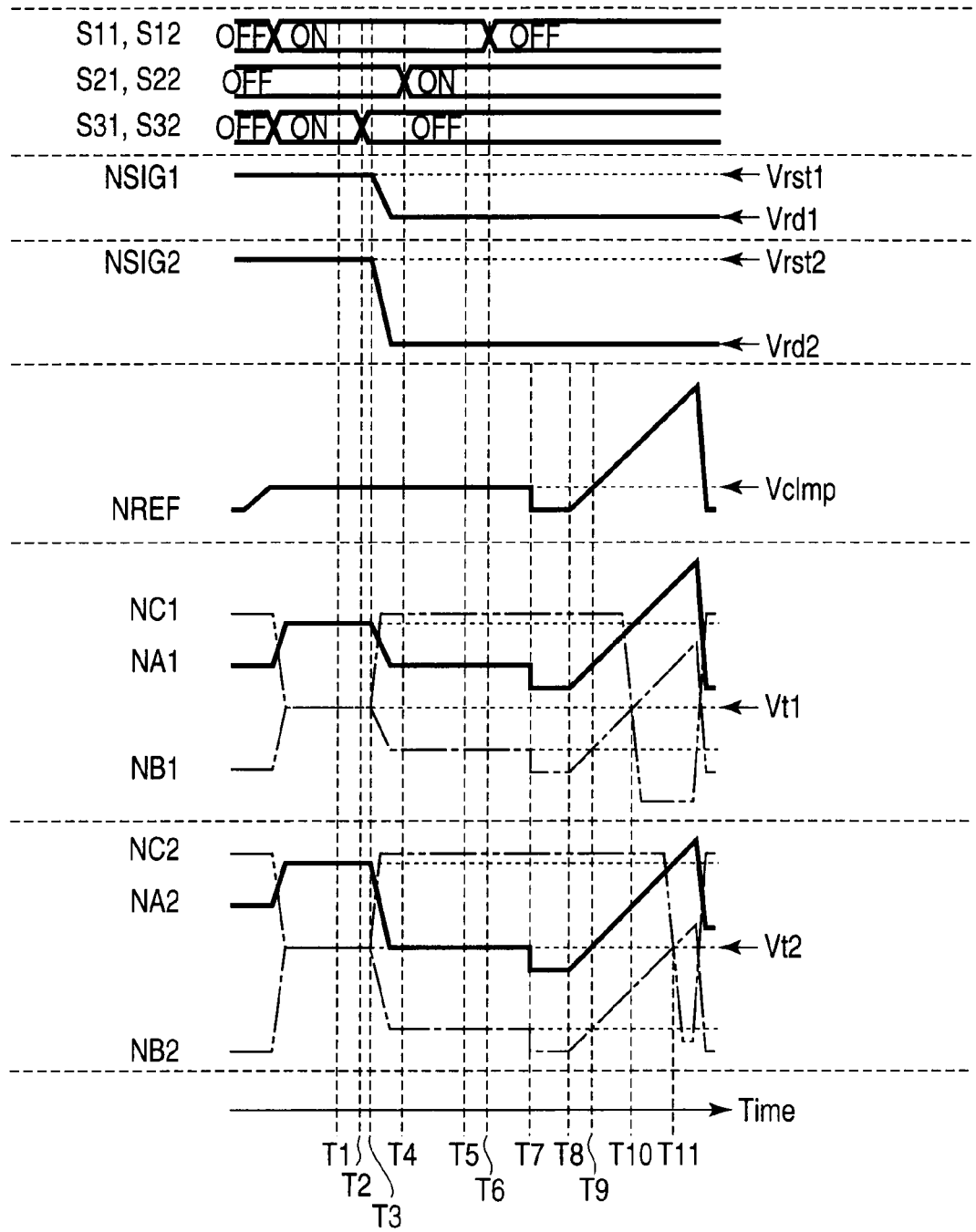
FIG. 2 is a timing chart showing the normal operation time of the solid-state image pickup device according to the first embodiment of the present invention.

A normal operation of the solid-state image pickup device according to this embodiment will be described below by using FIGS. 1 and 2. It should be noted that here, the case where the row selection circuit 20 selects the row of the pixels P1 and P2 is described as an example.

At the normal operation time, that is, when averaging of the vertical signal lines NSIG1 and NSIG2 is not carried out, the averaging switches SB and SC are opened. In this operation sequence, signal outputs of the pixels P1 and P2 are individually converted into digital data. The process will be described below in accordance with the timing chart of FIG. 2.

At time T1, the pixels P1 and P2 respectively output reference voltage levels Vrst1 and Vrst2 to the vertical signal lines NSIG1 and NSIG2. At this time, the switches S11, S12, S31, and S32 are turned on by the common control lines NS1 and NS2.

Here, the switches S11 and S12 are turned on, whereby the voltages of the nodes NA1 and NA2 become equal to the voltages Vrst1 and Vrst2 of the vertical signal lines NSIG1 and NSIG2, respectively. The input end and output end of the inverter INV1 are short-circuited by the switch S31, whereby negative feedback is applied to the inverter INV1. As a result of this, the voltages of the nodes NB1 and NC1 become equal to the circuit threshold Vt1 of the inverter INV1. The input end and output end of the inverter INV2 are short-circuited by the switch S32, whereby negative feedback is applied to the inverter INV2. As a result of this, the voltages of the nodes NB2 and NC2 become equal to the circuit threshold Vt2 of the inverter INV2. Thus, assuming the capacitance of the capacitor CAP21 to be Cp21, the capacitor CAP21 is charged with a charge of Cp21×(Vrst1−Vt1) between the nodes NA1 and NB1. Further, assuming the capacitance of the capacitor CAP22 to be Cp22, the capacitor CAP22 is charged with a charge of Cp22×(Vrst2−Vt2) between the nodes NA2 and NB2.

At time T2, the switches S31 and S32 are turned off.

At time T3, the voltages of the vertical signal lines NSIG1 and NSIG2 start to change to become signal output voltages Vrd1 and Vrd2 of the pixels P1 and P2, respectively. Here, output potential differences (Vrst1−Vrd1) and (Vrst2−Vrd2) of the pixels P1 and P2 are proportional to the input light quantity. A description will be given by assuming, for the sake of simplicity, that the voltages Vrst1 and Vrst2 are higher than the voltages Vrd1 and Vrd2, respectively, and (Vrst1−Vrd1) is smaller than (Vrst2−Vrd2) ((Vrst1−Vrd1)<(Vrst2−Vrd2)).

At time T4, the switches S21 and S22 controlled by the common control lines NS2 are turned on.

At time T5, the voltages of the nodes NV1 and NV2 become Vclmp, which is equal to the voltage of the node NREF, and the voltages of the vertical signal lines NSIG1 and NSIG2 become Vrd1 and Vrd2, respectively.

Thus, assuming the capacitance of the capacitor CAP11 to be Cp11, the capacitor CAP11 is charged with a charge of Cp11×(Vclmp−Vrd1) between the nodes NV1 and NA1. Further, assuming the capacitance of the capacitor CAP12 to be Cp12, the capacitor CAP12 is charged with a charge of Cp12× (Vclmp−Vrd2) between the nodes NV2 and NA2.

Between time T2 and time T5, the voltage of the node NA1 changes from Vrst1 to Vrd1, and hence the difference is (Vrd1−Vrst1). After time T2, the switches S31, S32, and SB are in the off-state. Accordingly, even when the voltages of the nodes NA1 and NA2 vary, the amount of charge accumulated in each of the capacitors CAP21 and CAP22 does not vary due to the law of conservation of charge. Accordingly, between time T2 and time T5, the amount of a change in voltage of the node NB1 is equal to the amount of a change in voltage of the node NA1, and is (Vrd1−Vrst1). Thus, the voltage Vnb1 of the node NB1 is expressed by the following formula (1). The node NC1 is the output of the inverter INV1, and hence if the voltage of the node NB1 is lower than Vt1, the voltage of the node NC1 becomes the high level.

$$V_{nb1} = V_{t1} - (V_{rst1} - V_{rd1}) \quad (1)$$

Likewise, between time T2 and time T5, the amount of a change in voltage of the node NB2 is equal to the amount of a change in voltage of the node NA2, and is (Vrd2−Vrst2). Thus, the voltage Vnb2 of the node NB2 is expressed by the following formula (2). The node NC2 is the output of the inverter INV2, and hence if the voltage of the node NB2 is lower than Vt2, the voltage of the node NC2 becomes the high level.

$$V_{nb2} = V_{t2} - (V_{rst2} - V_{rd2}) \quad (2)$$

At time T6, when the switches S11 and S12 are turned off, the amounts of variations in voltage of the ramp signal line NREF, nodes NA1, NB1, NA2, and NB2 become equal to each other due to the law of conservation of charge.

At time T7, the voltage of the ramp signal line NREF is temporarily lowered. Thereafter, when the voltage of the ramp signal line NREF is raised from time T8 at a fixed rate with respect to the time, the voltage thereof becomes the voltage Vclmp at time T9.

Furthermore, when the voltage of the ramp signal line NREF is further increased, and becomes Vclmp+(Vrst1−Vrd1), the voltage of the node NA1 becomes Vrd1+(Vrst1−Vrd1)=Vrst1, the voltage of the node NB1 becomes Vt1−(Vrst1−Vrd1)+(Vrst1−Vrd1)=Vt1, and the signal at the node NC1 of the output of the inverter INV1 is inverted. The time of this instant is set as time T10. Here, the T/D converter TDC1 counts the number of clocks from time T9 to time T10, and sets the counted number as digital data D1.

Further, when the voltage of the ramp signal line NREF increases to become Vclmp+(Vrst2−Vrd2), the voltage of the node NA2 becomes Vrd2+(Vrst2−Vrd2)=Vrst2, the voltage of the node NB2 becomes Vt2−(Vrst2−Vrd2)+(Vrst2−Vrd2)=Vt2, and the signal at the node NC2 of the output of the inverter INV2 is inverted. The time of this instant is set as time T11. Here, the T/D converter TDC2 counts the number of clocks from time T9 to time T11, and sets the counted number as digital data D2.

In the normal operation of this embodiment described above, the amount of an increase in voltage of the ramp signal line NREF is constant. Therefore, the counted number from time T9 to time T10 and the voltage difference (Vrst1−Vrd1), and the counted number from time T9 to time T11 and the voltage difference (Vrst2−Vrd2) are in proportion to each other. Accordingly, it can be said that the analog voltage differences (Vrst1−Vrd1) and (Vrst2−Vrd2) have been converted into digital data items D1 and D2 in accordance with a predetermined ratio. When different signals are output from the pixels P1 and P2 in the manner described above, if the averaging switches SB and SC are in the off-state, the T/D converters TDC1 and TDC2 output the output potential differences of the pixels P1 and P2 as the digital data items D1 and D2, respectively.

It should be noted that although the pixels P1 and P2 have been described here, an output potential difference of the other pixel of the same row also becomes digital data in the same way. Further, by driving the pixel of the other row in the same manner as described above, the output potential difference thereof becomes digital data. Further, although the description has been given above on the premise that the conditions of Vrst1>Vrd1, and Vrst2>Vrd2 are satisfied, in the case of the conditions of Vrst1<Vrd1, and Vrst2<Vrd2, if the drive voltage for the voltage of the ramp signal line NREF is inverted, the same result can be obtained. Further, if the condition of (Vrst1−Vrd1)>(Vrst2−Vrd2) is given, the time T10 becomes later than the time T11, and D1 becomes smaller than D2 (D1<D2).

[1-3] Averaging Operation

Figure 3:
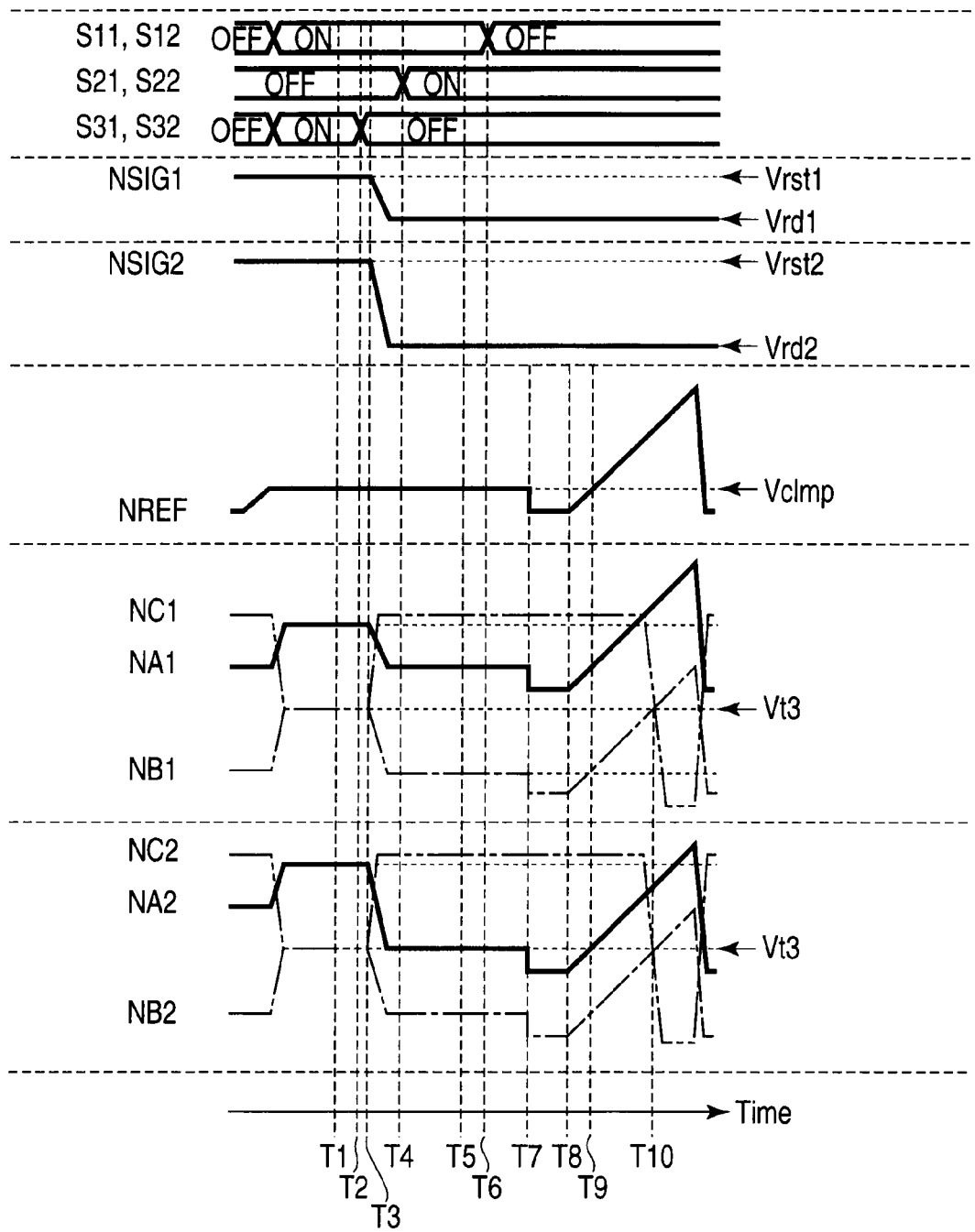
FIG. 3 is a timing chart showing the averaging operation time of the solid-state image pickup device according to the first embodiment of the present invention.

An averaging operation of the solid-state image pickup device according to this embodiment will be described below by using FIGS. 1 and 3. It should be noted that here, the case where the row selection circuit 20 selects the row of the pixels P1 and P2 is described as an example.

At the averaging operation time, that is, when averaging of the vertical signal lines NSIG1 and NSIG2 is carried out, the averaging switches SB and SC are turned on. In this operation sequence, signal outputs of the pixels P1 and P2 are averaged, and are converted into digital data. The process will be described below in accordance with the timing chart of FIG. 3.

First, when the averaging switches SB and SC are turned on, the input and output ends of the inverters INV1 and INV2 are short-circuited, and the inverters INV1 and INV2 are brought into the state where the inverters INV1 and INV2 possess a threshold Vt3 common to them.

At time T1, the voltages of the nodes NA1 and NA2 become the output voltages Vrst1 and Vrst2 of the pixels P1 and P2, and the voltages of the node NB1 and node NB2 become equal to Vt3. The capacitors CAP21 and CAP22 are charged with charges of Q1=Cp21×(Vrst1−Vt3) and Q2=Cp22×(Vrst2−Vt3), respectively, and the charges are held at time T2. At this time T2, the switches S31 and S32 are turned off.

At time T3, the voltages of the vertical signal lines NSIG1 and NSIG2 start to change to become the signal output voltages Vrd1 and Vrd2 of the pixels P1 and P2, respectively.

At time T4, the switches S21 and S22 controlled by the common control line NS2 are turned on.

At time T5, in the capacitors CAP11 and CAP12, charges of Cp11×(Vclmp−Vrd1) and Cp12×(Vclmp−Vrd2) are held, respectively. Here, the averaging switch SB is in the on-state. Accordingly, when the voltages of the nodes NA1 and NA2 have changed from Vrst1 and Vrst2 to Vrd1 and Vrd2, respectively, assuming the voltages of the nodes NB1 and NB2 after the change to be Vnb3, the condition of Q1+Q2=Cp21×(Vrd1−Vnb3)+Cp22×(Vrd2−Vnb3) is established. Accordingly, the voltage Vnb3 is expressed by the following formula (3).

$$V_{nb3} = V_{t3} - \frac{Cp_{21}(V_{rst1} - V_{rd1}) + Cp_{22}(V_{rst2} - V_{rd2})}{Cp_{21} + Cp_{22}} \quad (3)$$

At this time, the nodes NC1 and NC2 are short-circuited. Thus, when the voltages of the nodes NC1 and NC2 are equal to each other, and the voltage of the node NB1 is lower than Vt3, the voltage of the node NC1 becomes the high level. However, the voltage of the node NC1 does not exceed the range of the power-supply voltage of the inverters INV1 and INV2.

At time T6, when the switches S11 and S12 are turned off, the amounts of variations in voltage of the ramp signal line NREF, nodes NA1, NB1, NA2, and NB2 become equal to each other due to the law of conservation of charge.

At time T7, the voltage of the ramp signal line NREF is temporarily lowered. Thereafter, when the voltage of the ramp signal line NREF is raised from time T8 at a fixed rate with respect to the time, the voltage thereof becomes the voltage Vclmp at time T9.

Furthermore, when the voltage of the ramp signal line NREF is further increased, the voltages of the ramp signal line NREF, nodes NA1, NA2, NB1, and NB2 become those expressed by the following formulas (4) to (7).

$$V_{nref} = V_{clmp} + \frac{Cp_{21}(V_{rst1} - V_{rd1}) + Cp_{22}(V_{rst2} - V_{rd2})}{Cp_{21} + Cp_{22}} \quad (4)$$

$$V_{na1} = V_{rd1} + \frac{Cp_{21}(V_{rst1} - V_{rd1}) + Cp_{22}(V_{rst2} - V_{rd2})}{Cp_{21} + Cp_{22}} \quad (5)$$

$$V_{na2} = V_{rd2} + \frac{Cp_{21}(V_{rst1} - V_{rd1}) + Cp_{22}(V_{rst2} - V_{rd2})}{Cp_{21} + Cp_{22}} \quad (6)$$

$$V_{nb1} = V_{nb2} = V_{t3} \quad (7)$$

Here, the voltages of the nodes NB1 and NB2 are equal to the composite threshold Vt3 of the inverters INV1 and INV2. Accordingly, in this instant, the signals at the nodes NC1 and NC2 of the outputs of the inverters INV1 and INV2 are inverted. Each of the T/D converters TDC1 and TDC2 counts the number of clocks from time T9 to time T10, and sets the counted number as digital data D1 or D2.

In the averaging operation of this embodiment described above, the amount of an increase in voltage of the ramp signal line NREF is constant. Therefore, the counted number and the following formula (8) are in proportion to each other. Accordingly, it can be said that the analog voltage differences (Vrst1−Vrd1) and (Vrst2−Vrd2) have been converted into digital data items D1 and D2 in accordance with a predetermined ratio.

$$\frac{Cp_{21}(V_{rst1} - V_{rd1}) + Cp_{22}(V_{rst2} - V_{rd2})}{Cp_{21} + Cp_{22}} \quad (8)$$

When different signals are output from the pixels P1 and P2 in this way, if the averaging switches SB and SC are in the on-state, the T/D converters TDC1 and TDC2 average the output potential differences of the pixels P1 and P2, and output the resultant values as the digital data items D1 and D2. Further, the ratio is dependent on the capacitance Cp21 and capacitance Cp22 of the capacitors CAP21 and CAP22, and when the capacitance Cp21 and capacitance Cp22 are equal to each other, an arithmetic mean is obtained.

It should be noted that although the pixels P1 and P2 have been described here, an output potential difference of the other pixel of the same row also becomes digital data in the same way. Further, by driving the pixel of the other row in the same manner as described above, the output potential difference thereof becomes digital data. Further, although the description has been given above on the premise that the conditions of Vrst1>Vrd1, and Vrst2>Vrd2 are satisfied, in the case of the conditions of Vrst1<Vrd1, and Vrst2<Vrd2, if the drive voltage for the voltage of the ramp signal line NREF is inverted, the same result can be obtained. Further, both the digital data items D1 and D2 are obtained by converting the averages of the output voltage differences of the pixels P1 and P2 into digital values, and hence one of the data items is unnecessary. For this reason, the data that needs to be output becomes half that obtained when the averaging switches SB and SC are in the off-state.

[1-4] Advantage

According to the solid-state image pickup device of this embodiment described above, the device is provided with the averaging switches SB and SC for opening or short-circuiting the input and output ends of the inverters INV1 and INV2. Accordingly, by turning on the averaging switches SB and SC, signal outputs of a plurality of pixels can be output as average values corresponding to the ratio of the incorporated capacitance Cp21 and capacitance Cp22. At this time, by making the capacitance Cp21 and capacitance Cp22 equal to each other, it is possible to obtain arithmetic mean values with a high degree of accuracy.

Further, in the solid-state image pickup device of this embodiment, when the averaging switches SB and SC are turned off, the operation thereof is switched to the normal operation, and when the averaging switches SB and SC are turned on, the operation thereof is switched to the averaging operation. That is, it is possible to select one of the normal operation and averaging operation in accordance with the purpose of use by means of the drive circuit 40. Thus, for example, when a high-speed performance is required as in the case of time-varying image processing, it is advisable to turn on the averaging switches SB and SC in order to carry out the averaging operation. On the other hand, for example, when a high-resolution performance is required as in the case of still-image processing, it is advisable to turn off the averaging switches SB and SC in order to carry out the normal operation.

Second Embodiment

A second embodiment is a modification example of the first embodiment, and is an example in which two AD converters are provided, and the output signals of the pixels are distributed to the two AD converters in accordance with the purpose of use. It should be noted that here the point different from the first embodiment will be described.

[2-1] Configuration

FIG. 4 shows the circuit diagram of a solid-state image pickup device according to the second embodiment of the present invention. The circuit configuration of the solid-state image pickup device according to the second embodiment will be described below.

As shown in FIG. 4, in the second embodiment, the point different from the first embodiment is that a signal of a pixel P selected from a pixel group 10 is output to one of AD converters ADC1 and ADC2. Accordingly, the solid-state image pickup device of the second embodiment is provided with two AD converters ADC1 and ADC2, and changeover switches S41, S42, S51, and S52.

In FIG. 4, a combination of the AD converter ADC1 and switches S41 and S42 is arranged below the pixel group 10, and a combination of the AD converter ADC2 and switches S51 and S52 is arranged above the pixel group 10.

In the AD converter ADC1, the number of input terminals ND1 and ND2 is half the number of vertical signal lines NSIG1a, NSIG1b, NSIG2a, and NSIG2b. Likewise, in the AD converter ADC2, the number of input terminals NE1 and NE2 is half the number of vertical signal lines NSIG1a, NSIG1b, NSIG2a, and NSIG2b.

The switch S41 connects one of the vertical signal lines NSIG1a and NSIG1b in the pixel group 10 to the input terminal ND1 of the AD converter ADC1. The switch S42 connects one of the vertical signal lines NSIG2a and NSIG2b in the pixel group 10 to the input terminal ND2 of the AD converter ADC1. The switch S51 connects one of the vertical signal lines NSIG1a and NSIG1b in the pixel group 10 to the input terminal NE1 of the AD converter ADC2. The switch S52 connects one of the vertical signal lines NSIG2a and NSIG2b in the pixel group 10 to the input terminal NE2 of the AD converter ADC2. Control of the switches S41 and S42 is carried out by a drive circuit 40 in the AD converter ADC1, and control of the switches S51 and S52 is carried out by a drive circuit 40 in the AD converter ADC2.

[2-2] Operation

An operation of the solid-state image pickup device according to this embodiment will be described below by using FIG. 4. It should be noted that here, the case where a row selection circuit 20 selects the row of pixels P1, P2, P3, and P4 is described as an example, and it is assumed that the vertical signal lines NSIG1a and NSIG2a are odd-numbered columns, and the vertical signal lines NSIG1b and NSIG2b are even-numbered columns.

For example, the input terminals ND1 and ND2 of the AD converter ADC1 are connected to the vertical signal lines NSIG1b and NSIG2b of the even-numbered columns by the switches S41 and S42, and the input terminals NE1 and NE2 of the AD converter ADC2 are connected to the vertical signal lines NSIG1a and NSIG2a of the odd-numbered columns by the switches S51 and S52. In this case, the AD converter ADC1 processes output signals of the pixels P2 and P4 connected to the vertical signal lines NSIG1b and NSIG2b of the even-numbered columns, and the AD converter ADC2 processes output signals of the pixels P1 and P3 connected to the vertical signal lines NSIG1a and NSIG2a of the odd-numbered columns.

On the other hand, the input terminals ND1 and ND2 of the AD converter ADC1 are connected to the vertical signal lines NSIG1a and NSIG2a of the odd-numbered columns by the switches S41 and S42, and the input terminals NE1 and NE2 of the AD converter ADC2 are connected to the vertical signal lines NSIG1b and NSIG2b of the even-numbered columns by the switches S51 and S52. In this case, the AD converter ADC1 processes output signals of the pixels P1 and P3 connected to the vertical signal lines NSIG1a and NSIG2a of the odd-numbered columns, and the AD converter ADC2 processes output signals of the pixels P2 and P4 connected to the vertical signal lines NSIG1b and NSIG2b of the even-numbered columns.

It should be noted that in this embodiment too, by turning on or off the switches SB and SC, it is possible to carry out the normal operation or averaging operation as in the first embodiment.

[2-3] Advantage

According to the second embodiment described above, it is possible to obtain not only the same advantage as the first embodiment, but also the following advantage.

In the first embodiment, when it is desired to average signals of odd-numbered columns or signals of even-numbered columns, the wiring and switches for connecting the sample-and-hold signal conversion circuits of the odd-numbered columns straddle the sample-and-hold signal conversion circuit of the even-numbered column. In this case, the inner wiring of the sample-and-hold signal conversion circuit of the odd-numbered column and the sample-and-hold signal conversion circuit of the even-numbered column are capacitively coupled to each other, and there is the possibility of the normal averaging being unable to be carried out. Conversely, in the second embodiment, only signals of either the odd-numbered columns or the even-numbered columns are input to one AD converter, and hence it is possible to obtain the advantage that such capacitive coupling does not occur.

It should be noted that in this embodiment, although the output signals are distributed to the two AD converters ADC1 and ADC2 in accordance with whether the signal line is the odd-numbered column or even-numbered column, it is also possible to distribute the output signals on the basis of RGB.

Third Embodiment

A third embodiment is an example of an analog signal processing circuit functioning as an amplifier. It should be noted that here, the point different from the first embodiment will be described.

[3-1] Configuration

FIG. 5 shows a circuit diagram of a solid-state image pickup device according to the third embodiment of the present invention. The circuit configuration of the solid-state image pickup device according to the third embodiment will be described below.

As shown in FIG. 5, in the third embodiment, the point different from the first embodiment is that a sample-and-hold signal conversion circuit group 30A and a drive circuit 40 function not as an AD converter but as a mere signal amplifier circuit.

More specifically, a sample-and-hold signal conversion circuit corresponding to a vertical signal line NSIG1 includes a switch S61, capacitors CAP31 and CAP41, and an inverter INV11.

The switch S61 is controlled by a common control line NS1, and opens or short-circuits a node NB1 and node NC1. In the capacitor CAP31, one electrode is connected to the vertical signal line NSIG1, and the other electrode is connected to the node NB1. In the capacitor CAP41, one electrode is connected to the node NB1, and the other electrode is connected to the node NC1. In the inverter INV11, an inverting input electrode is connected to the node NB1, and an output electrode is connected to the node NC1. Here, the inverter INV11 and switch S61 constitute an inverting amplifier including a negative feedback switch.

A sample-and-hold signal conversion circuit corresponding to a vertical signal line NSIG2 includes a switch S62, capacitors CAP32 and CAP42, and an inverter INV12.

The switch S62 is controlled by a common control line NS1, and opens or short-circuits a node NB2 and node NC2. In the capacitor CAP32, one electrode is connected to the vertical signal line NSIG2, and the other electrode is connected to the node NB2. In the capacitor CAP42, one electrode is connected to the node NB2, and the other electrode is connected to the node NC2. In the inverter INV12, an inverting input electrode is connected to the node NB2, and an output electrode is connected to the node NC2. Here, the inverter INV12 and switch S62 constitute an inverting amplifier including a negative feedback switch.

The averaging switches SB and SC is shared the two sets of sample-and-hold signal conversion circuits corresponding to the vertical signal lines NSIG1 and NSIG2. The averaging switch SB is controlled by a common control line NSB, and opens or short-circuits the node NB1 and node NB2. The averaging switch SC is controlled by a common control line NSC, and opens or short-circuits the node NC1 and node NC2. By turning on the averaging switches SB and SC, the vertical signal lines NSIG1 and NSIG2 are averaged. Accordingly, the signal outputs of pixels P1 and P2 are averaged.

It should be noted that in this embodiment, an AD converter (not shown) may be connected to the nodes NC1 and NC2. In this case, as the configuration of the AD converter, that of an AD converter shown in any other embodiment, or that of a general conventional AD converter may be employed. In the former case, the merit that the mean error of the signal can be made less than in the latter case is obtained.

[3-2] Normal Operation Time

Figure 6:
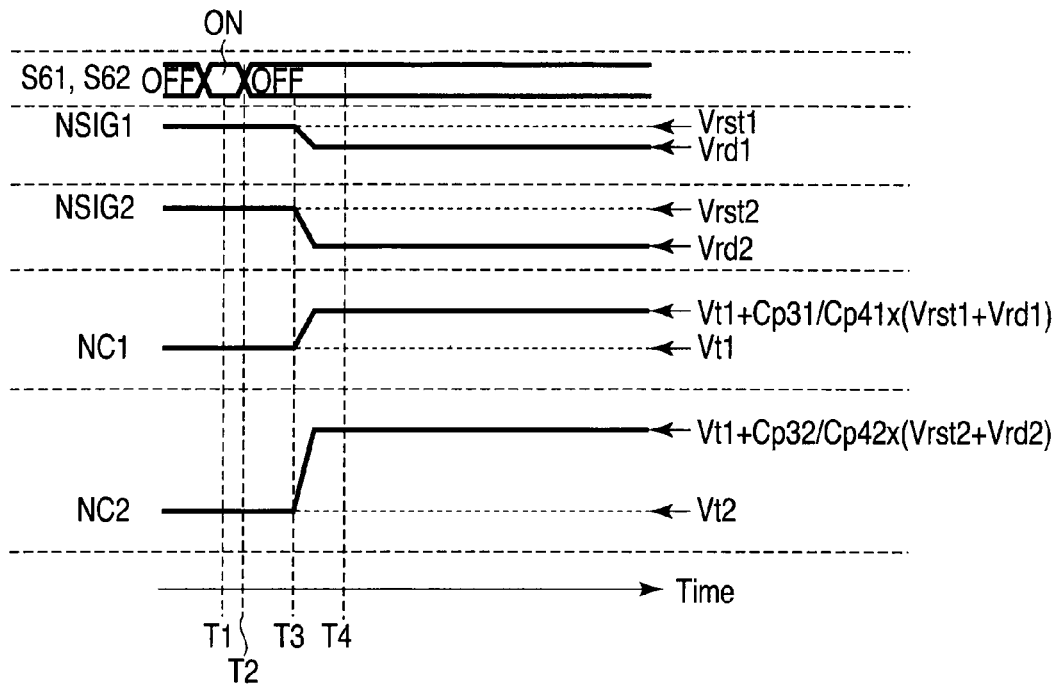
FIG. 6 is a timing chart showing the normal operation time of the solid-state image pickup device according to the third embodiment of the present invention.

A normal operation of the solid-state image pickup device according to this embodiment will be described below by using FIGS. 5 and 6. It should be noted that here, the case where a row selection circuit 20 selects the row of the pixels P1 and P2 is described as an example.

At the normal operation time, that is, when averaging of the vertical signal lines NSIG1 and NSIG2 is not carried out, the averaging switches SB and SC are turned off. In this operation sequence, signal outputs of the pixels P1 and P2 are individually amplified. The process will be described below in accordance with the timing chart of FIG. 6.

At time T1, the pixels P1 and P2 respectively output reference voltage levels Vrst1 and Vrst2 to the vertical signal lines NSIG1 and NSIG2. At this time, the switches S61 and S62 are turned on by the common control line NS1.

Here, the switch S61 is turned on, whereby negative feedback is applied to the inverter INV11. As a result of this, the voltages of the nodes NB1 and NC1 become equal to the circuit threshold Vt1 of the inverter INV11. The switch S62 is turned on, whereby negative feedback is applied to the inverter INV12. As a result of this, the voltages of the nodes NB2 and NC2 become equal to the circuit threshold Vt2 of the inverter INV12.

Thus, assuming the capacitance of the capacitor CAP31 to be Cp31, the capacitor CAP31 is charged with a charge of Cp31×(Vrst1−Vt1) between the vertical signal line NSIG1 and node NB1. Further, assuming the capacitance of the capacitor CAP32 to be Cp32, the capacitor CAP32 is charged with a charge of Cp32×(Vrst2−Vt2) between the vertical signal line NSIG2 and node NB2.

At time T2, the switches S61 and S62 are turned off.

At time T3, the voltages of the vertical signal lines NSIG1 and NSIG2 start to change to become signal output voltages Vrd1 and Vrd2 of the pixels P1 and P2, respectively. Here, output potential differences (Vrst1−Vrd1) and (Vrst2−Vrd2) of the pixels P1 and P2 are proportional to the input light quantity. A description will be given by assuming, for the sake of simplicity, that the voltages Vrst1 and Vrst2 are higher than the voltages Vrd1 and Vrd2, respectively.

At time T4, the voltages of the vertical signal lines NSIG1 and NSIG2 become the signal output voltages Vrd1 and Vrd2 of the pixels P1 and P2, respectively. As for the inverters INV11 and INV12, by virtue of the effect of the negative feedback capacitance CAP41 and negative feedback capacitance CAP42, the voltages of the nodes NC1 and NC2 change so that the voltages of the nodes NB1 and NB2 can be kept at Vt1 and Vt2, respectively. On the other hand, at time T2, the switches S61 and S62 have been turned off, and hence, considering the law of conservation of charge of the nodes NB1 and NC1, the following two formulas are established with respect to the voltage at time T4.

$$V_{nc1} = V_{t1} + \frac{Cp_{31}(V_{rst1} - V_{rd1})}{Cp_{41}} \quad (9)$$

$$V_{nc2} = V_{t2} + \frac{Cp_{32}(V_{rst2} - V_{rd2})}{Cp_{42}} \quad (10)$$

Further, assuming the potential differences of the nodes NC1 and NC2 at time T2 and at time T4 to be ΔVnc1 and ΔVnc2, respectively, the potential differences ΔVnc1 and ΔVnc2 can be expressed by the following formulas (11) and (12).

$$\Delta V_{nc1} = \frac{Cp_{31}(V_{rst1} - V_{rd1})}{Cp_{41}} \quad (11)$$

$$\Delta V_{nc2} = \frac{Cp_{32}(V_{rst2} - V_{rd2})}{Cp_{42}} \quad (12)$$

In the normal operation of this embodiment described above, output amplitudes of the nodes NC1 and NC2 are Cp31/Cp41×Vrst1−Vrd1) and Cp32/Cp42×(Vrst2−Vrd2), and output signal amplitudes of the pixels P1 and P2 are (Vrst1−Vrd1) and (Vrst2−Vrd2). Accordingly, the output amplitudes of the node NC1 and NC2 are obtained by multiplying the output signal amplitudes of the pixels P1 and P2 by the capacitance ratios Cp31/Cp41 and Cp32/Cp42, respectively.

As described above, in the third embodiment, when the averaging switches SB and SC are in the off-state, the signals of the vertical signal lines NSIG1 and NSIG2 are amplified in accordance with the ratio of the capacitance Cp31/Cp32, and the capacitance Cp32/Cp42, respectively.

It should be noted that although here the pixels P1 and P2 have been described, by driving pixels of the other row, the output potential differences are amplified. Further, although the description has been given above on the premise that the conditions of Vrst1>Vrd1, and Vrst2>Vrd2 are satisfied, in the case of the conditions of Vrst1<Vrd1, and Vrst2<Vrd2, if the drive voltage for the voltage of the ramp signal line NREF is inverted, the same result can be obtained.

[3-3] Averaging Operation

Figure 7:
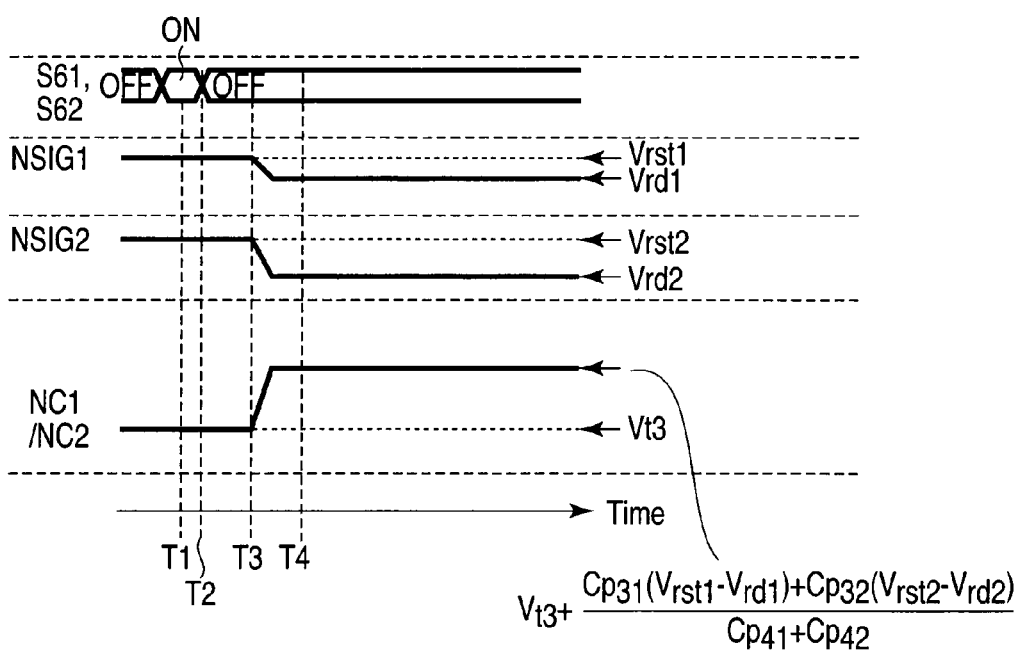
FIG. 7 is a timing chart showing the averaging operation time of the solid-state image pickup device according to the third embodiment of the present invention.

An averaging operation of the solid-state image pickup device according to this embodiment will be described below by using FIGS. 5 and 7. It should be noted that here, the case where the row selection circuit 20 selects the row of the pixels P1 and P2 is described as an example.

At the averaging operation time, that is, when averaging of the vertical signal lines NSIG1 and NSIG2 is carried out, the averaging switches SB and SC are turned on. In this case, the signal outputs of the pixels P1 and P2 are averaged and amplified in accordance with the ratios of the capacitance Cp31, Cp32, Cp41 and Cp42. The process will be described below in accordance with the timing chart of FIG. 7.

First, when the averaging switches SB and SC are turned on, the input and output ends of the inverters INV11 and INV12 are short-circuited, the inverters INV11 and INV12 are brought into the state where the inverters INV11 and INV12 possess a threshold Vt3 common to them, and both of them carry out operations equal to each other.

At time T1, reference voltage levels Vrst1 and Vrst2 of the pixels P1 and P2 are output to the vertical signal lines NSIG1 and NSIG2, respectively. At this time, the switches S61 and S62 are turned on by the common control line NS1. Here, the switches S61, S62, SB, and SC are in the on-state, and hence negative feedback is applied to the inverters INV11 and INV12. As a result of this, the voltages of the nodes NB1 and NC1 become equal to the composite threshold Vt3 of the inverters INV11 and INV12. Accordingly, the capacitor CAP31 is charged with a charge of Cp31×(Vrst1−Vt3) between the vertical signal line NSIG1 and the node NB1. Further, the capacitor CAP32 is charged with a charge of Cp32×(Vrst2−Vt3) between the vertical signal line NSIG2 and the node NB2.

At time T2, the switches S61 and S62 are turned off.

At time T3, the voltages of the vertical signal lines NSIG1 and NSIG2 start to change to become the signal output voltages Vrd1 and Vrd2 of the pixels P1 and P2, respectively. Here, output potential differences (Vrst1−Vrd1) and (Vrst2−Vrd2) of the pixels P1 and P2 are proportional to the input light quantity. A description will be given by assuming, for the sake of simplicity, that the voltages Vrst1 and Vrst2 are higher than the voltages Vrd1 and Vrd2, respectively.

At time T4, the voltages of the vertical signal lines NSIG1 and NSIG2 become the signal output voltages Vrd1 and Vrd2 of the pixels P1 and P2, respectively. However, as for the inverters INV11 and INV12, by virtue of the effect of the negative feedback capacitance CAP41 and negative feedback capacitance CAP42, the voltages of the nodes NC1 and NC2 change so that the voltages of the nodes NB1 and NB2 can be kept at Vt3. On the other hand, at time T2, the switches S61 and S62 have been turned off, and hence, considering the law of conservation of charge of the nodes NB1 and NC1, the following formula is established with respect to the voltage at time T4.

$$V_{nc1} = V_{nc2} = V_{t3} + \frac{Cp_{31}(V_{rst1} - V_{rd1}) + Cp_{32}(V_{rst2} - V_{rd2})}{Cp_{41} + Cp_{42}} \quad (13)$$

Further, assuming the potential differences of the nodes NC1 and NC2 at time T2 and at time T4 to be ΔVnc1 and ΔVnc2, the potential differences ΔVnc1 and ΔVnc2 can be expressed by the following formula (14).

$$\Delta V_{nc1} = \Delta V_{nc2} = \frac{Cp_{31}(V_{rst1} - V_{rd1}) + Cp_{32}(V_{rst2} - V_{rd2})}{Cp_{41} + Cp_{42}} \quad (14)$$

By the averaging operation of this embodiment described above, it is possible to average and amplify the output signal amplitudes (Vrst1−Vrd1) and (Vrst2−Vrd2) of the pixels P1 and P2 by the constant ratios of the capacitance Cp31, Cp32, Cp41, and Cp42 in the output amplitude.

[3-4] Advantage

According to the third embodiment described above, it is possible to obtain the same advantage as the first embodiment.

Fourth Embodiment

A fourth embodiment is a modification example of the third embodiment, and is an example in which two signal amplifier circuits are provided, and the output signals of the pixels are distributed to the two signal amplifier circuits in accordance with the purpose of use. It should be noted that here the point different from the first and third embodiments will be described.

[4-1] Configuration

FIG. 8 shows the circuit diagram of a solid-state image pickup device according to the fourth embodiment of the present invention. The circuit configuration of the solid-state image pickup device according to the fourth embodiment will be described below.

As shown in FIG. 8, in the fourth embodiment, the point different from the third embodiment is that a signal of a pixel P selected from a pixel group 10 is output to one of signal amplifier circuits AMP1 and AMP2. Accordingly, the solid-state image pickup device of the fourth embodiment is provided with two signal amplifier circuits AMP1 and AMP2, and changeover switches S41, S42, S51, and S52.

In FIG. 8, a combination of the signal amplifier circuit AMP1 and switches S41 and S42 is arranged below the pixel group 10, and a combination of the signal amplifier circuit AMP2 and switches S51 and S52 is arranged above the pixel group 10.

In the signal amplifier circuit AMP1, the number of input terminals ND1 and ND2 is half the number of vertical signal lines NSIG1a, NSIG1b, NSIG2a, and NSIG2b. Likewise, in the signal amplifier circuit AMP2, the number of input terminals NE1 and NE2 is half the number of vertical signal lines NSIG1a, NSIG1b, NSIG2a, and NSIG2b.

The switch S41 connects one of the vertical signal lines NSIG1a and NSIG1b in the pixel group 10 to the input terminal ND1 of the signal amplifier circuit AMP1. The switch S42 connects one of the vertical signal lines NSIG2a and NSIG2b in the pixel group 10 to the input terminal ND2 of the signal amplifier circuit AMP1. The switch S51 connects one of the vertical signal lines NSIG1a and NSIG1b in the pixel group 10 to the input terminal NE1 of the signal amplifier circuit AMP2. The switch S52 connects one of the vertical signal lines NSIG2a and NSIG2b in the pixel group 10 to the input terminal NE2 of the signal amplifier circuit AMP2. Control of the switches S41 and S42 is carried out by a drive circuit 40 in the signal amplifier circuit AMP1, and control of the switches S51 and S52 is carried out by a drive circuit 40 in the signal amplifier circuit AMP2.

[4-2] Operation

An operation of the solid-state image pickup device according to this embodiment will be described below by using FIG. 8. It should be noted that here, the case where a row selection circuit 20 selects the row of pixels P1, P2, P3, and P4 is described as an example, and it is assumed that the vertical signal lines NSIG1a and NSIG2a are odd-numbered columns, and the vertical signal lines NSIG1b and NSIG2b are even-numbered columns.

For example, the input terminals ND1 and ND2 of the signal amplifier circuit AMP1 are connected to the vertical signal lines NSIG1b and NSIG2b of the even-numbered columns by the switches S41 and S42, and the input terminals NE1 and NE2 of the signal amplifier circuit AMP2 are connected to the vertical signal lines NSIG1a and NSIG2a of the odd-numbered columns by the switches S51 and S52. In this case, the signal amplifier circuit AMP1 processes output signals of the pixels P2 and P4 connected to the vertical signal lines NSIG1b and NSIG2b of the even-numbered columns, and the signal amplifier circuit AMP2 processes output signals of the pixels P1 and P3 connected to the vertical signal lines NSIG1a and NSIG2a of the odd-numbered columns.

On the other hand, the input terminals ND1 and ND2 of the signal amplifier circuit AMP1 are connected to the vertical signal lines NSIG1a and NSIG2a of the odd-numbered columns by the switches S41 and S42, and the input terminals NE1 and NE2 of the signal amplifier circuit AMP2 are connected to the vertical signal lines NSIG1b and NSIG2b of the even-numbered columns by the switches S51 and S52. In this case, the signal amplifier circuit AMP1 processes output signals of the pixels P1 and P3 connected to the vertical signal lines NSIG1a and NSIG2a of the odd-numbered columns, and the signal amplifier circuit AMP2 processes output signals of the pixels P2 and P4 connected to the vertical signal lines NSIG1b and NSIG2b of the even-numbered columns.

It should be noted that in this embodiment too, by turning on or off the switches SB and SC, it is possible to carry out the normal operation or averaging operation as in the third embodiment.

[4-3] Advantage

According to the fourth embodiment described above, it is possible to obtain not only the same advantage as the first and third embodiments, but also the following advantage.

In the third embodiment, when it is desired to average signals of odd-numbered columns or signals of even-numbered columns, the wiring and switches for connecting the sample-and-hold signal conversion circuits of the odd-numbered columns straddle the sample-and-hold signal conversion circuit of the even-numbered column. In this case, the inner wiring of the sample-and-hold signal conversion circuit of the odd-numbered column and the sample-and-hold signal conversion circuit of the even-numbered column are capacitively coupled to each other, and there is the possibility of the normal averaging being unable to be carried out. Conversely, in the fourth embodiment, only signals of either the odd-numbered columns or the even-numbered columns are input to one signal amplifier circuit, and hence it is possible to obtain the advantage that such capacitive coupling does not occur.

It should be noted that in this embodiment, although the output signals are distributed to the two signal amplifier circuits AMP1 and APM2 in accordance with whether the signal line is the odd-numbered column or even-numbered column, it is also possible to distribute the output signals on the basis of RGB.

Fifth Embodiment

A fifth embodiment is a modification example of the first embodiment, and is an example in which a ramp signal is input as a reference voltage of the inverters. It should be noted that here, the point different from the first embodiment will be described.

[5-1] Configuration

Figure 9:
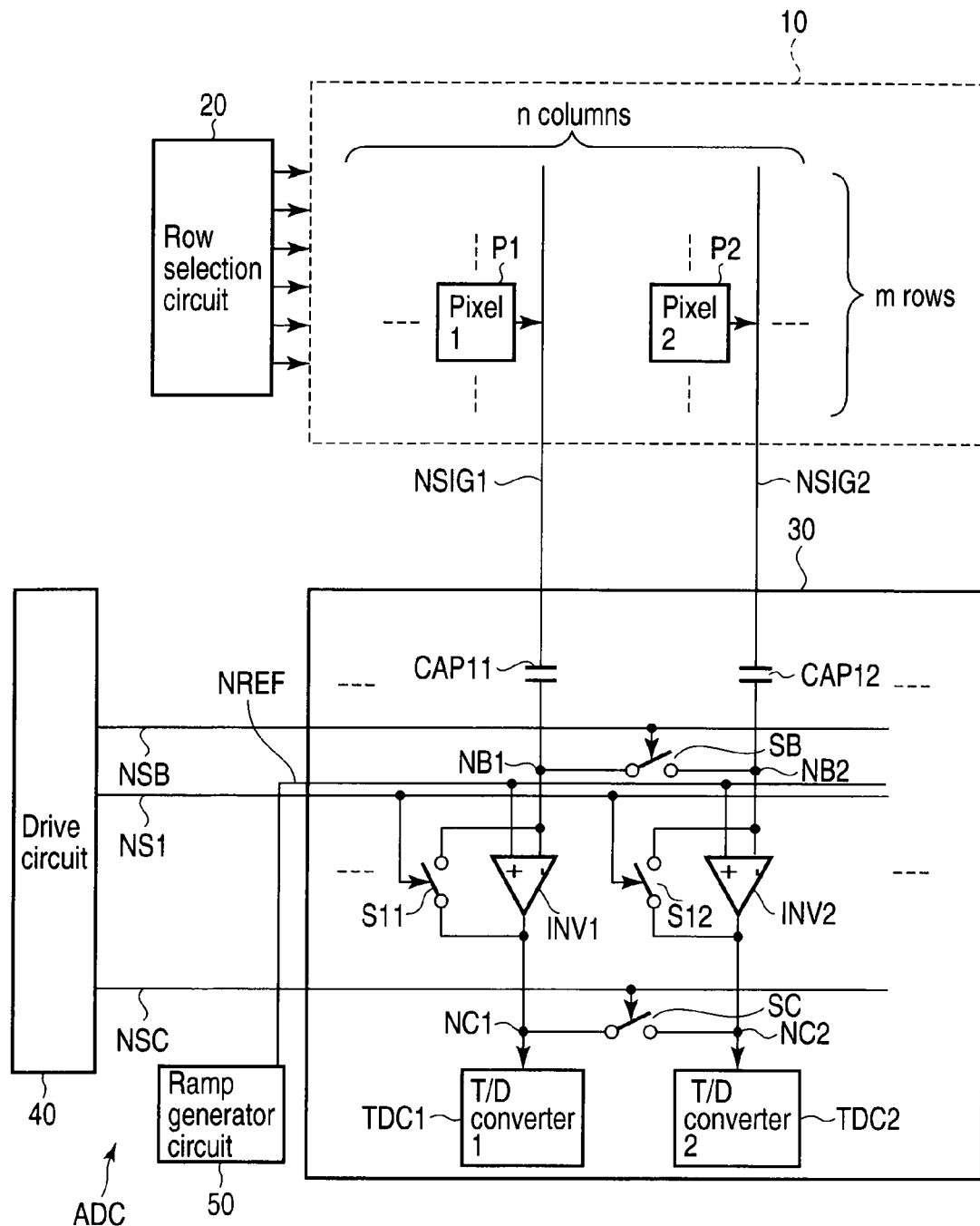
FIG. 9 is a circuit diagram showing a solid-state image pickup device according to a fifth embodiment of the present invention.

FIG. 9 shows a circuit diagram of a solid-state image pickup device according to the fifth embodiment of the present invention. The circuit configuration of the solid-state image pickup device according to the fifth embodiment will be described below.

As shown in FIG. 9, in the fifth embodiment, the point different from the first embodiment is that a ramp generator circuit 50 inputs a reference voltage for A/D conversion to inverters INV1 and INV2 through a ramp signal line NREF.

More specifically, a sample-and-hold signal conversion circuit corresponding to a vertical signal line NSIG1 includes a switch S11, capacitor CAP11, and inverter INV1.

The switch S11 is controlled by a common control line NS1, and opens or short-circuits a node NB1 and node NC1. In the capacitor CAP11, one electrode is connected to the vertical signal line NSIG1, and the other electrode is connected to the node NB1. In the inverter INV1, a non-inverting input electrode (+) is connected to the ramp signal line NREF, inverting input electrode (−) is connected to the node NB1, and output electrode is connected to the node NC1. Here, the inverter INV1 and switch S11 constitute an inverting amplifier including a negative feedback switch.

A sample-and-hold signal conversion circuit corresponding to a vertical signal line NSIG2 includes a switch S12, capacitor CAP12, and inverter INV2.

The switch S12 is controlled by the common control line NS1, and opens or short-circuits a node NB2 and node NC2. In the capacitor CAP12, one electrode is connected to the vertical signal line NSIG2, and the other electrode is connected to the node NB2. In the inverter INV2, a non-inverting input electrode (+) is connected to the ramp signal line NREF, a inverting input electrode (−) is connected to the node NB2, and an output electrode is connected to the node NC2. Here, the inverter INV2 and switch S12 constitute an inverting amplifier including a negative feedback switch.

The averaging switches SB and SC is shared the two sets of sample-and-hold signal conversion circuits corresponding to the vertical signal lines NSIG1 and NSIG2. The averaging switch SB is controlled by a common control line NSB, and opens or short-circuits the node NB1 and node NB2. The averaging switch SC is controlled by a common control line NSC, and opens or short-circuits the node NC1 and node NC2. By turning on the averaging switches SB and SC, the vertical signal lines NSIG1 and NSIG2 are averaged. Accordingly, the signal outputs of pixels P1 and P2 are averaged.

[5-2] Normal Operation Time

Figure 10:
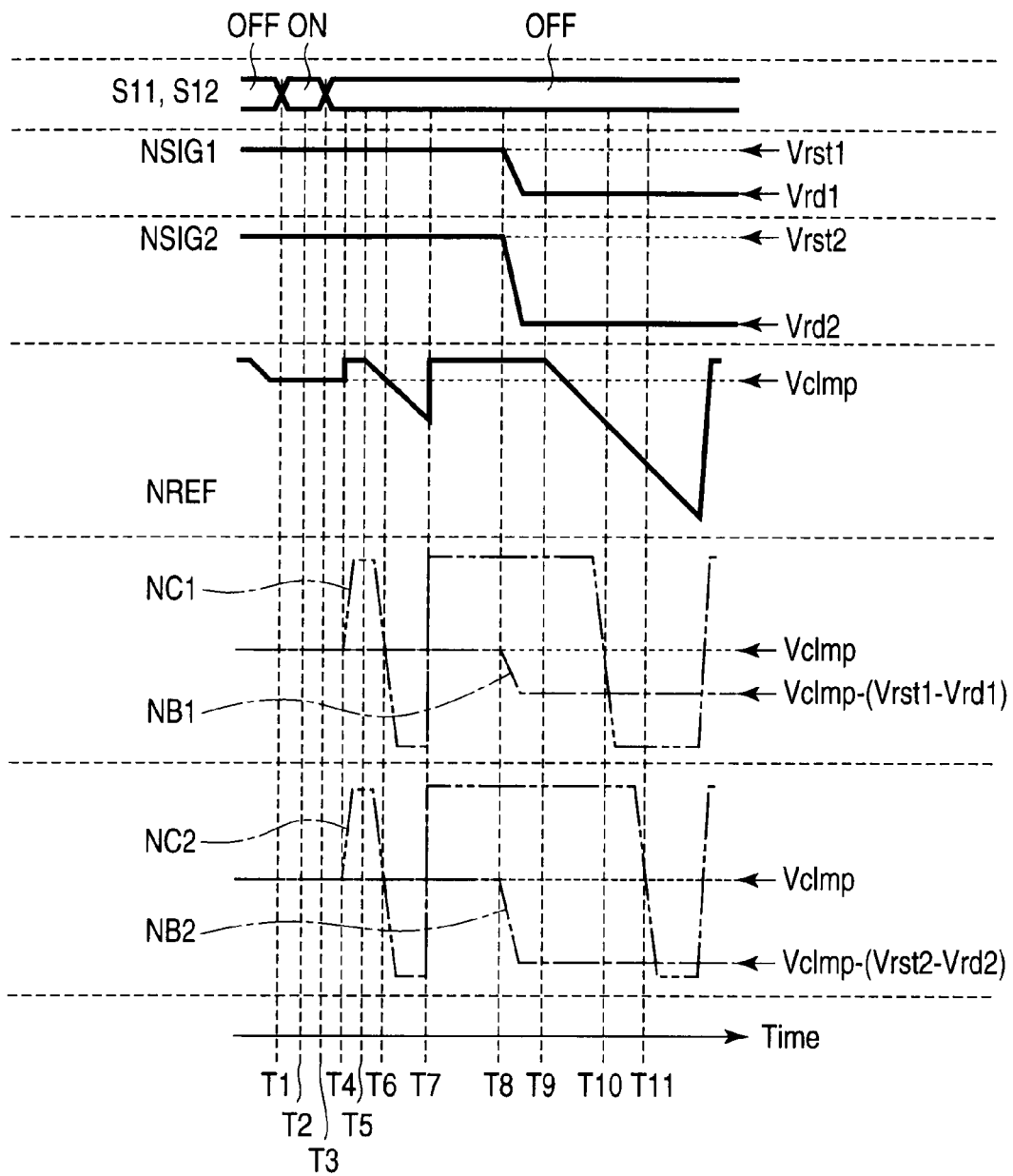
FIG. 10 is a timing chart showing the normal operation time of the solid-state image pickup device according to the fifth embodiment of the present invention.

A normal operation of the solid-state image pickup device according to this embodiment will be described below by using FIGS. 9 and 10. It should be noted that here, the case where a row selection circuit 20 selects the row of the pixels P1 and P2 is described as an example.

At the normal operation time, that is, when averaging of the vertical signal lines NSIG1 and NSIG2 is not carried out, the averaging switches SB and SC are in the off-state. In this operation sequence, signal outputs of the pixels P1 and P2 are individually converted into digital data. The process will be described below in accordance with the timing chart of FIG. 10.

At time T1, the pixels P1 and P2 respectively output reference voltage levels Vrst1 and Vrst2 to the vertical signal lines NSIG1 and NSIG2. At this time, the switches S11 and S12 are turned on by the common control line NS1.

Here, the switch S11 is turned on, whereby negative feedback is applied to the inverter INV1. Furthermore, the voltage of the ramp signal line NREF is Vclmp, and hence the voltages of the nodes NB1 and NC1 become equal to Vclmp. The switch S12 is turned on, whereby negative feedback is also applied to the inverter INV2. Furthermore, the voltage of the ramp signal line NREF is Vclmp, and hence the voltages of the nodes NB2 and NC2 become equal to Vclmp.

Accordingly, assuming that the capacitance of the capacitor CAP11 to be Cp11, the capacitor CAP11 is charged with a charge of Cp11×(Vrst1−Vclmp) between the vertical signal line NSIG1 and node NB1. Further, assuming that the capacitance of the capacitor CAP12 to be Cp12, the capacitor CAP12 is charged with a charge of Cp12×(Vrst2−Vclmp) between the vertical signal line NSIG2 and node NB2. Further, at time T2, the charging is completed.

At time T3, the switches S11 and S12 are turned off.

At time T4, the voltage of the ramp signal line NREF is raised to the voltage of the vertical signal lines NSIG1 and NSIG2. As a result of this, the non-inverting input voltage of the inverters INV1 and INV2 rises with the inverting input voltage of the inverters kept unchanged, and hence the voltages of the nodes NC1 and NC2 respectively become the high level.

When the voltage of the ramp signal line NREF is reduced at a fixed rate with respect to the time from time T5, the voltage of the ramp signal line NREF becomes Vclmp at time T6, and the voltages of the nodes NC1 and NC2 change from the high level to low level. It should be noted that T/D converters TDC1 and TDC2 respectively record the numbers of reference clocks CKRST1 and CKRST2 between time T5 and time T6 at the nodes NC1 and NC2.

At time T7, when the voltage of the ramp signal line NREF rises again, the voltages of the nodes NC1 and NC2 become the high level again.

At time T8, the voltages of the vertical signal lines NSIG1 and NSIG2 start to change to become the signal output voltages Vrd1 and Vrd2 of the pixels P1 and P2, and become stable after time T9. Here, output potential differences (Vrst1−Vrd1) and (Vrst2−Vrd2) of the pixels P1 and P2 are proportional to the input light quantity. A description will be given by assuming, for the sake of simplicity, that the voltages Vrst1 and Vrst2 are higher than the voltages Vrd1 and Vrd2, respectively. By the law of conservation of charge, a change in voltage of each of the vertical signal lines NSIG1 and NSIG2, and a change in voltage of each of the nodes NB1 and NB2 are equal to each other, and hence the voltages of the nodes NB1 and NB2 become Vclm1−(Vrst1−Vrd1) and Vclmp−(Vrst2−Vrd2), respectively.

When the voltage of the ramp signal line NREF is reduced at a fixed rate, i.e., at the same rate as that from time T5 to time T7 with respect to the time from time T9, the voltage of the ramp signal line NREF becomes Vclmp−(Vrst1−Vrd1) at time T10, further, the voltage of the node NB1 is Vclmp−

(Vrst1−Vrd1), and hence the voltage of the node NC1 changes from the high level to the low level. At this time, the T/D converter TDC1 records the number of reference clocks CKRD1 between time T9 and time T10 at the node NC1.

At time T11, the voltage of the ramp signal line NREF becomes Vclmp−(Vrst2−Vrd2), further, the voltage of the node NB2 is Vclmp−(Vrst2−Vrd2), and hence the voltage of the node NC2 changes from the high level to the low level. At this time, the T/D converter TDC2 records the number of reference clocks CKRD2 between time T9 and time T11 at the node NC2.

Here, the voltage of the ramp signal line NREF changes at the same rate from time T5 to time T7, and from time T9 to time T11. Accordingly, (CKRD1−CKRST1) and (CKRD2−CKRST2) are proportional to (Vrst1−Vrd1) and (Vrst2−Vrd2), respectively.

In the normal operation of this embodiment described above, the numbers of clocks (CKRD1−CKRST1) and (CKRD2−CKRST2) proportional to the output potential differences (Vrst1−Vrd1) and (Vrst2−Vrd2) of the pixels P1 and P2 can be obtained, and A/D conversion of the signal outputs of the pixels P1 and P2 is independently carried out.

It should be noted that although the pixels P1 and P2 have been described here, as for a pixel of the other row, by driving the pixel of the other row in the same manner as described above, the output potential difference thereof becomes digital data. Further, although the description has been given above on the premise that the conditions of Vrst1>Vrd1, and Vrst2>Vrd2 are satisfied, in the case of the conditions of Vrst1<Vrd1, and Vrst2<Vrd2, if the drive voltage for the voltage of the ramp signal line NREF is inverted, the same result can be obtained.

[5-3] Averaging Operation

Figure 11:
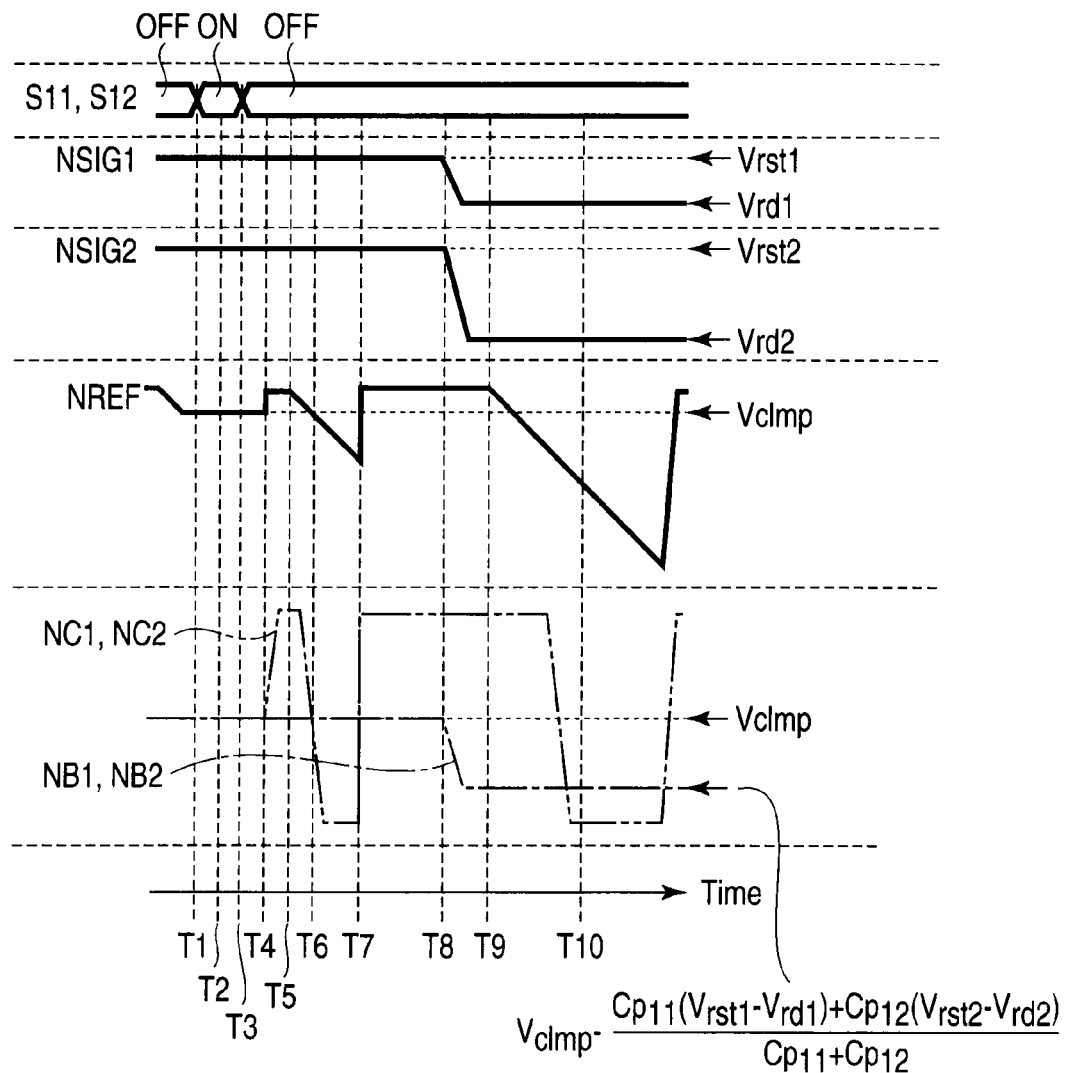
FIG. 11 is a timing chart showing the averaging operation time of the solid-state image pickup device according to the fifth embodiment of the present invention.

An averaging operation of the solid-state image pickup device according to this embodiment will be described below by using FIGS. 9 and 11. It should be noted that here, the case where the row selection circuit 20 selects the row of the pixels P1 and P2 is described as an example.

At the averaging operation time, that is, when averaging of the vertical signal lines NSIG1 and NSIG2 is carried out, the averaging switches SB and SC are turned on. In this case, the signal outputs of the pixels P1 and P2 are averaged in accordance with the ratio of the capacitance Cp11 to capacitance Cp12 to be subjected to A/D conversion. The process will be described below in accordance with the timing chart of FIG. 12.

First, when the averaging switches SB and SC are turned on, the input and output ends of the inverters INV1 and INV2 are short-circuited, and the inverters each perform an operation equivalent to that of an amplifier possessing a composite threshold conforming to voltages of the non-inverting input and inverting input.

At time T1, the reference voltage levels Vrst1 and Vrst2 of the pixels P1 and P2 are respectively output to the vertical signal lines NSIG1 and NSIG2. At this time, the switches S11 and S12 are turned on by the common control line NS1.

Here, the switches S11 and S12 are turned on, whereby the negative feedback is applied to the inverters INV1 and INV2. Furthermore, the voltage of the ramp signal line NREF is Vclmp, and hence the voltages of the nodes NB1, NB2, NC1, and NC2 become equal to Vclmp.

As a result of this, the capacitor CAP11 is charged with a charge of Cp11×(Vrst1−Vclmp) between the vertical signal line NSIG1 and node NB1. Further, the capacitor CAP12 is charged with a charge of Cp12×(Vrst2−Vclmp) between the vertical signal line NSIG2 and node NB2. Further, at time T2, the charging is completed.

At time T3, the switches S11 and S12 are turned off.

At time T4, the voltage of the ramp signal line NREF is raised to the voltage of the vertical signal lines NSIG1 and NSIG2. As a result of this, the non-inverting input voltage of the inverters INV1 and INV2 rises with the inverting input voltage of the inverters kept unchanged, and hence the voltages of the nodes NC1 and NC2 respectively become the high level.

When the voltage of the ramp signal line NREF is reduced at a fixed rate with respect to the time from time T5, the voltage of the ramp signal line NREF becomes Vclmp at time T6, and the voltages of the nodes NC1 and NC2 change from the high level to low level. It should be noted that the T/D converters TDC1 and TDC2 respectively record the numbers of reference clocks CKRST1 and CKRST2 between time T5 and time T6 at the nodes NC1 and NC2.

At time T7, when the voltage of the ramp signal line NREF rises again, the voltages of the nodes NC1 and NC2 become the high level again.

At time T8, the voltages of the vertical signal lines NSIG1 and NSIG2 start to change to become the signal output voltages Vrd1 and Vrd2 of the pixels P1 and P2, and become stable after time T9. Here, output potential differences (Vrst1−Vrd1) and (Vrst2−Vrd2) of the pixels P1 and P2 are proportional to the input light quantity. A description will be given by assuming, for the sake of simplicity, that the voltages Vrst1 and Vrst2 are higher than the voltages Vrd1 and Vrd2, respectively. By the law of conservation of charge, a change in voltage of each of the vertical signal lines NSIG1 and NSIG2, and a change in voltage of each of the nodes NB1 and NB2 are equal to each other, and hence the voltages of the nodes NB1 and NB2 become a voltage expressed by the following formula.

$$V_{nb1} = V_{nb2} = V_{clmp} - \frac{Cp_{11}(V_{rst1} - V_{rd1}) + Cp_{12}(V_{rst2} - V_{rd2})}{Cp_{11} + Cp_{12}} \quad (15)$$

When the voltage of the ramp signal line NREF is reduced at a fixed rate, i.e., at the same rate as that from time T5 to time T7 with respect to the time from time T9, the voltage Vnref of the ramp signal line NREF becomes a voltage expressed by the following formula (16) at time T10. As a result of this, the voltages of the nodes NC1 and NC2 change from the high level to the low level. At this time, the T/D converters TDC1 and TDC2 respectively record the number of reference clocks CKRD1 and CKRD2 between time T9 and time T10 at the node NC1.

$$V_{nref} = V_{clmp} - \frac{Cp_{11}(V_{rst1} - V_{rd1}) + Cp_{12}(V_{rst2} - V_{rd2})}{Cp_{11} + Cp_{12}} \quad (16)$$

Here, the voltage of the ramp signal line NREF changes at the same rate from time T5 to time T7, and from time T9 to time T11. Accordingly, (CKRD1−CKRST1) and (CKRD2−CKRST2) are proportional to a voltage shown by the following expression (17). This voltage is dependent on (Vrst1−Vrd1), (Vrst2−Vrd2), and the capacitance ratio of the capacitors CAP11 and CAP12.

$$\frac{Cp_{11}(V_{rst1} - V_{rd1}) + Cp_{12}(V_{rst2} - V_{rd2})}{Cp_{11} + Cp_{12}} \quad (17)$$

In the averaging operation of this embodiment described above, the numbers of clocks (CKRD1−CKRST1) and (CKRD2−CKRST2) which are proportional to the voltage dependent on the output potential differences (Vrst1−Vrd1) and (Vrst2−Vrd2) of the pixels P1 and P2, and the capacitance ratio of the capacitors CAP11 and CAP12 are obtained, and A/D conversion of the signals obtained by averaging the signal outputs of the pixels P1 and P2 is carried out.

[5-4] Advantage

According to the fifth embodiment described above, it is possible to obtain not only the same advantage as the first embodiment, but also the following advantage.

In the fifth embodiment, the configuration thereof in which a delay from a change in the input of the inverter to a change in the output thereof, and a delay from the transmission of a clock by the drive circuit to the arrival thereof at the T/D converter hardly affect the ADC characteristics makes it possible to cause the counter for transmitting a signal to the T/D converter to change at a higher speed correspondingly. As a result of this, in the fifth embodiment, it is possible to carry out the A/D conversion processing at a higher speed.

Sixth Embodiment

A sixth embodiment is a modification example of the fifth embodiment, and is an example in which two AD converters are provided, and the output signals of the pixels are distributed to the two AD converters in accordance with the purpose of use. It should be noted that here the point different from the first and fifth embodiments will be described.

[6-1] Configuration

Figure 12:
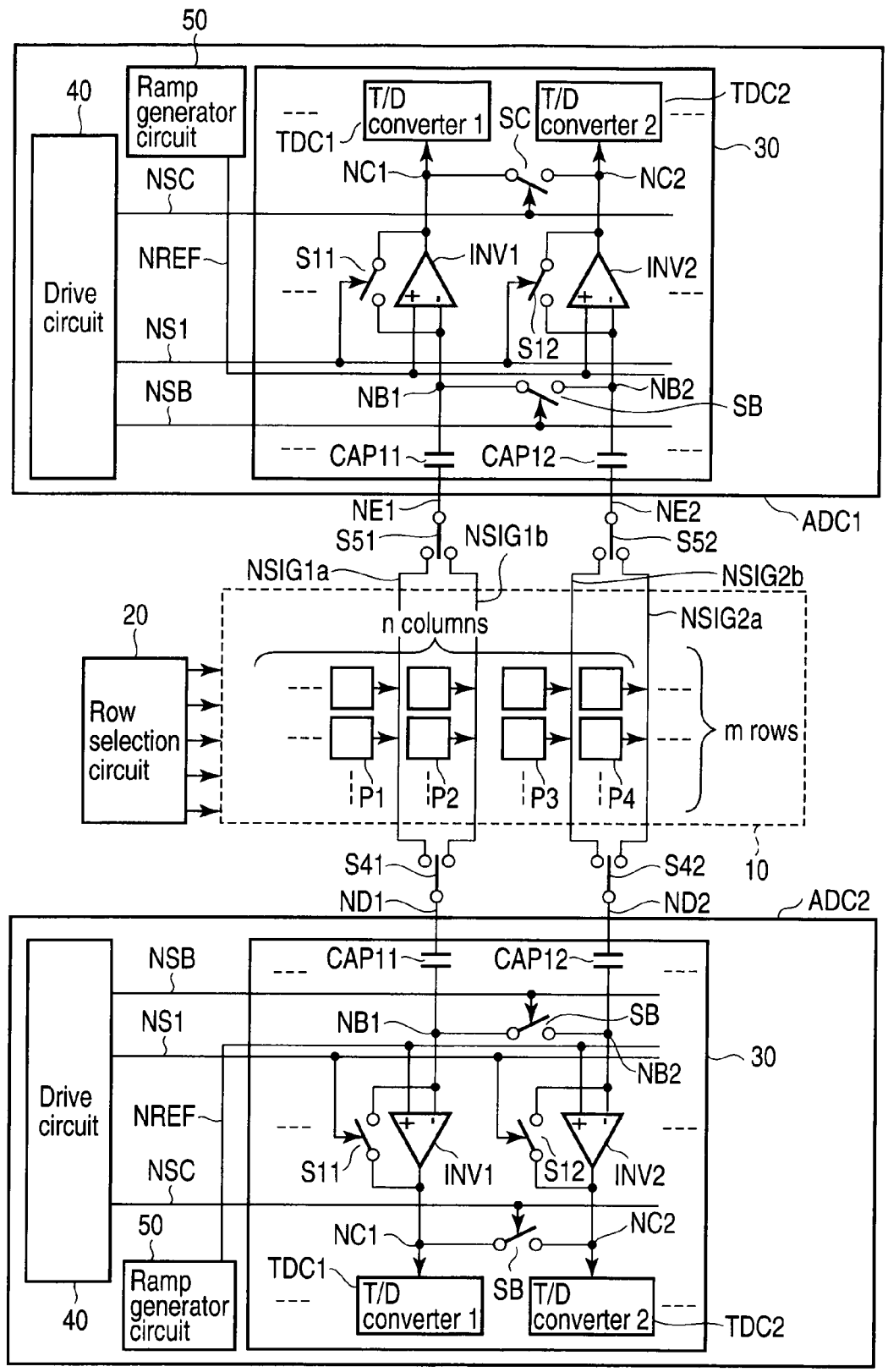
FIG. 12 is a circuit diagram showing a solid-state image pickup device according to a sixth embodiment of the present invention.

FIG. 12 shows the circuit diagram of a solid-state image pickup device according to the sixth embodiment of the present invention. The circuit configuration of the solid-state image pickup device according to the sixth embodiment will be described below.

As shown in FIG. 12, in the sixth embodiment, the point different from the fifth embodiment is that a signal of a pixel P selected from a pixel group 10 is output to one of AD converters ADC1 and ADC2. Accordingly, the solid-state image pickup device of the sixth embodiment is provided with two AD converters ADC1 and ADC2, and changeover switches S41, S42, S51, and S52.

In FIG. 12, a combination of the AD converter ADC1 and switches S41 and S42 is arranged below the pixel group 10, and a combination of the AD converter ADC2 and switches S51 and S52 is arranged above the pixel group 10.

In the AD converter ADC1, the number of input terminals ND1 and ND2 is half the number of vertical signal lines NSIG1a, NSIG1b, NSIG2a, and NSIG2b. Likewise, in the AD converter ADC2, the number of input terminals NE1 and NE2 is half the number of vertical signal lines NSIG1a, NSIG1b, NSIG2a, and NSIG2b.

The switch S41 connects one of the vertical signal lines NSIG1a and NSIG1b in the pixel group 10 to the input terminal ND1 of the AD converter ADC1. The switch S42 connects one of the vertical signal lines NSIG2a and NSIG2b in the pixel group 10 to the input terminal ND2 of the AD converter ADC1. The switch S51 connects one of the vertical signal lines NSIG1a and NSIG1b in the pixel group 10 to the input terminal NE1 of the AD converter ADC2. The switch S52 connects one of the vertical signal lines NSIG2a and NSIG2b in the pixel group 10 to the input terminal NE2 of the AD converter ADC2. Control of the switches S41 and S42 is carried out by a drive circuit 40 in the AD converter ADC1, and control of the switches S51 and S52 is carried out by a drive circuit 40 in the AD converter ADC2.

[6-2] Operation

An operation of the solid-state image pickup device according to this embodiment will be described below by using FIG. 12. It should be noted that here, the case where a row selection circuit 20 selects the row of pixels P1, P2, P3, and P4 is described as an example, and it is assumed that the vertical signal lines NSIG1a and NSIG2a are odd-numbered columns, and the vertical signal lines NSIG1b and NSIG2b are even-numbered columns.

For example, the input terminals ND1 and ND2 of the AD converter ADC1 are connected to the vertical signal lines NSIG1b and NSIG2b of the even-numbered columns by the switches S41 and S42, and the input terminals NE1 and NE2 of the AD converter ADC2 are connected to the vertical signal lines NSIG1a and NSIG2a of the odd-numbered columns by the switches S51 and S52. In this case, the AD converter ADC1 processes output signals of the pixels P2 and P4 connected to the vertical signal lines NSIG1b and NSIG2b of the even-numbered columns, and the AD converter ADC2 processes output signals of the pixels P1 and P3 connected to the vertical signal lines NSIG1a and NSIG2a of the odd-numbered columns.

On the other hand, the input terminals ND1 and ND2 of the AD converter ADC1 are connected to the vertical signal lines NSIG1a and NSIG2a of the odd-numbered columns by the switches S41 and S42, and the input terminals NE1 and NE2 of the AD converter ADC2 are connected to the vertical signal lines NSIG1b and NSIG2b of the even-numbered columns by the switches S51 and S52. In this case, the AD converter ADC1 processes output signals of the pixels P1 and P3 connected to the vertical signal lines NSIG1a and NSIG2a of the odd-numbered columns, and the AD converter ADC2 processes output signals of the pixels P2 and P4 connected to the vertical signal lines NSIG1b and NSIG2b of the even-numbered columns.

It should be noted that in this embodiment too, by turning on or off the switches SB and SC, it is possible to carry out the normal operation or averaging operation as in the fifth embodiment.

[6-3] Advantage

According to the sixth embodiment described above, it is possible to obtain not only the same advantage as the first and fifth embodiments, but also the following advantage.

In the fifth embodiment, when it is desired to average signals of odd-numbered columns or signals of even-numbered columns, the wiring and switches for connecting the sample-and-hold signal conversion circuits of the odd-numbered columns straddle the sample-and-hold signal conversion circuit of the even-numbered column. In this case, the inner wiring of the sample-and-hold signal conversion circuit of the odd-numbered column and the sample-and-hold signal conversion circuit of the even-numbered column are capacitively coupled to each other, and there is the possibility of the normal averaging being unable to be carried out. Conversely, in the sixth embodiment, only signals of either the odd-numbered columns or the even-numbered columns are input to one AD converter, and hence it is possible to obtain the advantage that such capacitive coupling does not occur.

It should be noted that in this embodiment, although the output signals are distributed to the two AD converters ADC1 and ADC2 in accordance with whether the signal line is the odd-numbered column or even-numbered column, it is also possible to distribute the output signals on the basis of RGB.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An analog signal processing circuit comprising:
a first signal line;
a second signal line; and
a first signal conversion circuit connected to the first and second signal lines, wherein the first signal conversion circuit comprises
a first capacitor having a first electrode which is connected to the first signal line, and a second electrode which is connected to a first node;
a second capacitor having a third electrode which is connected to the second signal line, and a fourth electrode which is connected to a second node;
a first inverting amplifier having a first input electrode which is connected to the first node, a first output electrode which is connected to a third node, and which includes a first negative feedback switch;
a second inverting amplifier having a second input electrode which is connected to the second node, a second output electrode which is connected to a fourth node, and which includes a second negative feedback switch;
a first averaging switch configured to connect between the first node and second node; and
a second averaging switch configured to connect between the third node and fourth node.

2. The circuit according to claim 1, wherein
the first signal conversion circuit further comprises a first T/D converter connected to the third node;
a second T/D converter connected to the fourth node;
a ramp signal line;
a first switch connected between the first signal line and first electrode, the first switch being controlled by a first control signal;
a second switch connected between the second signal line and third electrode, the second switch being controlled by the first control signal;
a third switch connected between the ramp signal line and a fifth node, the third switch being controlled by a second control signal;
a fourth switch connected between the ramp signal line and a sixth node, the fourth switch being controlled by the second control signal;
a third capacitor having a fifth electrode which is connected to the fifth node, and a sixth electrode which is connected to the first electrode; and
a fourth capacitor having a seventh electrode which is connected to the sixth node, and an eighth electrode which is connected to the third electrode.

3. The circuit according to claim 1, wherein the first signal conversion circuit further comprises
a third capacitor having a fifth electrode which is connected to the first node, and a sixth electrode which is connected to the third node; and
a fourth capacitor having a seventh electrode which is connected to the second node, and an eighth electrode which is connected to the fourth node.

4. The circuit according to claim 1, wherein
the first signal conversion circuit further comprises
a ramp generator circuit configured to supply a reference potential of the first and second inverting amplifiers;
a first T/D converter connected to the third node; and
a second T/D converter connected to the fourth node.

5. The circuit according to claim 1, further comprising a drive circuit configured to control third, fourth, and fifth control signals, wherein
the third control signal controls the first averaging switch, fourth control signal controls the second averaging switch, and fifth control signal controls the first and second negative feedback switches.

6. The circuit according to claim 1, further comprising:
a first odd-numbered column signal line;
a first even-numbered column signal line;
a second odd-numbered column signal line;
a second even-numbered column signal line;
a first changeover switch configured to connect one of the first odd-numbered column signal line and first even-numbered column signal line to the first signal line; and
a second changeover switch configured to connect one of the second odd-numbered column signal line and second even-numbered column signal line to the second signal line.

7. The circuit according to claim 6, further comprising:
a third changeover switch configured to connect a column signal line different from the column signal line connected by the first changeover switch to a third signal line;
a fourth changeover switch for connecting a column signal line different from the column signal line connected by the second changeover switch to a fourth signal line; and
a second signal conversion circuit connected to the third and fourth signal lines, configured identical with the first signal conversion circuit.

8. The circuit according to claim 7, wherein the first signal conversion circuit further comprises
a first T/D converter connected to the third node;
a second T/D converter connected to the fourth node;
a ramp signal line;
a first switch connected between the first signal line and first electrode, the first switch being controlled by a first control signal;
a second switch connected between the second signal line and third electrode, the second switch being controlled by the first control signal;
a third switch connected between the ramp signal line and a fifth node, the third switch being controlled by a second control signal;
a fourth switch connected between the ramp signal line and a sixth node, the fourth switch being controlled by a second control signal;
a third capacitor having a fifth electrode which is connected to the fifth node, and a sixth electrode which is connected to the first electrode; and
a fourth capacitor having a seventh electrode which is connected to the sixth node, and an eighth electrode which is connected to the third electrode.

9. The circuit according to claim 7, wherein the first signal conversion circuit further comprises
a third capacitor having a fifth electrode which is connected to the first node, and a sixth electrode which is connected to the third node; and
a fourth capacitor having a seventh electrode which is connected to the second node, and an eighth electrode which is connected to the fourth node.

10. The circuit according to claim 7, wherein
the first signal conversion circuit further comprises
a ramp generator circuit configured to supply a reference potential of the first and second inverting amplifiers;
a first T/D converter connected to the third node; and
a second T/D converter connected to the fourth node.

11. A solid-state image pickup device comprising:
first and second photoelectric conversion sections for converting light into an electric signal;
a first signal line configured to receive an electric signal from the first photoelectric conversion section;
a second signal line configured to receive an electric signal from the second photoelectric conversion section; and
a signal conversion circuit connected to the first and second signal lines, wherein the signal conversion circuit comprises
a first capacitor having a first electrode which is connected to the first signal line, and a second electrode which is connected to a first node;
a second capacitor having a third electrode which is connected to the second signal line, and a fourth electrode which is connected to a second node;
a first inverting amplifier having a first input electrode which is connected to the first node, a first output electrode which is connected to a third node, and which includes a first negative feedback switch;
a second inverting amplifier having a second input electrode which is connected to the second node, a second output electrode which is connected to a fourth node, and which includes a second negative feedback switch;
a first averaging switch configured to connect between the first node and second node; and
a second averaging switch configured to connect between the third node and fourth node.

12. The device according to claim 11, wherein the signal conversion circuit further comprises
a first T/D converter connected to the third node;
a second T/D converter connected to the fourth node;
a ramp signal line;
a first switch connected between the first signal line and first electrode, the first switch being controlled by a first control signal;
a second switch connected between the second signal line and third electrode, the second switch being controlled by the first control signal;
a third switch connected between the ramp signal line and a fifth node, the third switch being controlled by a second control signal;
a fourth switch connected between the ramp signal line and a sixth node, the fourth switch being controlled by the second control signal;
a third capacitor having a fifth electrode which is connected to the fifth node, and a sixth electrode which is connected to the first electrode; and
a fourth capacitor having a seventh electrode which is connected to the sixth node, and an eighth electrode which is connected to the third electrode.

13. The device according to claim 11, wherein the signal conversion circuit further comprises
a third capacitor having a fifth electrode which is connected to the first node, and a sixth electrode which is connected to the third node; and
a fourth capacitor having a seventh electrode which is connected to the second node, and an eighth electrode which is connected to the fourth node.

14. The device according to claim 11, wherein
the signal conversion circuit further comprises
a ramp generator circuit configured to supply a reference potential of the first and second inverting amplifiers;
a first T/D converter connected to the third node; and
a second T/D converter connected to the fourth node.

15. The device according to claim 11, further comprising a drive circuit connected to control third, fourth, and fifth control signals, wherein
the third control signal controls the first averaging switch, fourth control signal controls the second averaging switch, and fifth control signal controls the first and second negative feedback switches.

16. A solid-state image pickup device comprising:
first, second, third, and fourth photoelectric conversion sections for converting light into an electric signal;
a first signal line configured to convert an electric signal from the first photoelectric conversion section;
a second signal line configured to receive an electric signal from the second photoelectric conversion section;
a third signal line configured to receive an electric signal from the third photoelectric conversion section;
a fourth signal line for receiving an electric signal from the fourth photoelectric conversion section;
a first switch arranged at one ends of the first signal line and second signal line, the first switch connecting one of the first and second signal lines to a fifth signal line;
a second switch arranged at one ends of the third signal line and fourth signal line, the second switch connecting one of the third and fourth signal lines to a sixth signal line;
a third switch arranged at the other ends of the first signal line and second signal line, the third switch connecting the other one of the first and second signal lines to a seventh signal line;
a fourth switch arranged at the other ends of the third signal line and fourth signal line, the fourth switch connecting the other one of the third and fourth signal lines to an eighth signal line;
a first signal conversion circuit connected to a first node connected to the fifth signal line, and a second node connected to the sixth signal line; and
a second signal conversion circuit connected to a first node connected to the seventh signal line, and a second node connected to the eighth signal line,
wherein each of the first and second signal conversion circuits comprises
a first capacitor having a first electrode which is connected to the first node, and a second electrode which is connected to a third node;
a second capacitor having a third electrode which is connected to the second node, and a fourth electrode which is connected to a fourth node;
a first inverting amplifier having a first input electrode which is connected to the third node, a first output electrode which is connected to a fifth node, and which includes a first negative feedback switch;
a second inverting amplifier having a second input electrode which is connected to the fourth node, a second output electrode which is connected to a sixth node, and which includes a second negative feedback switch;
a first averaging switch configured to connect between the third node and fourth node; and
a second averaging switch configured to connect between the fifth node and sixth node.

17. The device according to claim 16, wherein each of the first and second signal conversion circuits further comprises
a first T/D converter connected to the fifth node;
a second T/D converter connected to the sixth node;
a ramp signal line;
a first switch controlled by a first control signal, connected between one of the first node and the first electrode;
a second switch controlled by the first control signal, connected between the second node and the third electrode;

a third switch controlled by a second control signal, connected between the ramp signal line and a seventh node;

a fourth switch controlled by the second control signal, connected between the ramp signal line and an eighth node;

a third capacitor having a fifth electrode which is connected to the seventh node, and a sixth electrode which is connected to the first electrode; and a fourth capacitor having a seventh electrode which is connected to the eighth node, and an eighth electrode which is connected to the third electrode.

18. The device according to claim 16, wherein each of the first and second signal conversion circuits further comprises a third capacitor having a fifth electrode which is connected to the third node, and a sixth electrode which is connected to the fifth node; and a fourth capacitor having a seventh electrode which is connected to the fourth node, and an eighth electrode which is connected to the sixth node.

19. The device according to claim 16, wherein each of the first and second signal conversion circuits further comprises a ramp generator circuit configured to supply a reference potential of the first and second inverting amplifiers;

a first T/D converter connected to the fifth node; and a second T/D converter connected to the sixth node.

20. The device according to claim 16, further comprising:

a first drive circuit configured to control third, fourth, and fifth control signals; and second drive circuit configured to control sixth, seventh, and eighth control signals, wherein the third control signal controls the first averaging switch in the first signal conversion circuit, the fourth control signal controls the second averaging switch in the first signal conversion circuit, the fifth control signal controls the first and second negative feedback switches in the first signal conversion circuit, the sixth control signal controls the first averaging switch in the second signal conversion circuit, the seventh control signal controls the second averaging switch in the second signal conversion circuit, and the eighth control signal controls the first and second negative feedback switches in the second signal conversion circuit.

* * * * *